(12) United States Patent
Williams et al.

(10) Patent No.: US 10,449,619 B2
(45) Date of Patent: Oct. 22, 2019

(54) SYSTEM FOR PROCESSING A WORKPIECE

(71) Applicant: Peddinghaus Corporation, Bradley, IL (US)

(72) Inventors: James Williams, Manteno, IL (US); Edward Brzezniak, Bourbonnais, IL (US); Peter Eckert, Kankakee, IL (US)

(73) Assignee: Peddinghaus Corporation, Bradley, IL (US)

( * ) Notice: Subject to any disclaimer, the term of this patent is extended or adjusted under 35 U.S.C. 154(b) by 480 days.

(21) Appl. No.: 15/290,592

(22) Filed: Oct. 11, 2016

(65) Prior Publication Data
US 2017/0129039 A1    May 11, 2017

Related U.S. Application Data

(60) Provisional application No. 62/252,895, filed on Nov. 9, 2015.

(51) Int. Cl.
*B23K 10/00* (2006.01)
*B23K 7/10* (2006.01)
(Continued)

(52) U.S. Cl.
CPC .............. *B23K 10/006* (2013.01); *B23K 7/10* (2013.01); *B23K 7/102* (2013.01); *B23K 26/032* (2013.01);
(Continued)

(58) Field of Classification Search
CPC ........ B23K 10/006; B23K 7/10; B23K 7/102; B23K 26/032; B23K 26/1494;
(Continued)

(56) References Cited

U.S. PATENT DOCUMENTS

| 5,844,196 A | 12/1998 | Oakley | |
|---|---|---|---|
| 7,091,442 B2 * | 8/2006 | Hughes | B23K 9/007 219/121.45 |

(Continued)

FOREIGN PATENT DOCUMENTS

WO    95/26251    10/1995

OTHER PUBLICATIONS

"Image Processing for Automated Robotic Welding", XP-001548305, Welding and Cutting 8 (2009) No. 5, pp. 273-275.

*Primary Examiner* — Mark H Paschall
(74) *Attorney, Agent, or Firm* — Wood, Phillips, Katz, Clark & Mortimer

(57) ABSTRACT

A system (40) for processing a workpiece includes a support surface (88) for supporting a workpiece (44). The system (40) includes a processing tool (92) movable with respect to a processing path. The system (40) includes a sensor carriage (408) movable along a scan axis and having a light source (476, 515, 550, 586) located to emit a light beam at an angle to the scan axis onto a target surface of a workpiece (44), and a camera (484, 522, 558, 594) configured to record location data of the light beam on a target surface of a workpiece (44) as the sensor carriage (408) moves along the scan axis. The system (40) includes a control system for generating a three-dimensional point representation of a workpiece surface from the light beam location data, to control movement of the processing tool (92) based on the three-dimensional point representation of a workpiece (44).

2 Claims, 22 Drawing Sheets

(51) Int. Cl.
*G06T 7/00* (2017.01)
*H04N 5/225* (2006.01)
*H04N 5/247* (2006.01)
*B23K 37/02* (2006.01)
*B23K 26/03* (2006.01)
*B23K 26/14* (2014.01)
*B23Q 17/24* (2006.01)
*G05B 19/401* (2006.01)
*G05B 19/42* (2006.01)
*H05H 1/02* (2006.01)

(52) U.S. Cl.
CPC ...... *B23K 26/1494* (2013.01); *B23K 37/0235* (2013.01); *B23K 37/0258* (2013.01); *B23Q 17/2404* (2013.01); *B23Q 17/2409* (2013.01); *B23Q 17/249* (2013.01); *G05B 19/401* (2013.01); *G05B 19/4207* (2013.01); *G06T 7/0004* (2013.01); *H04N 5/2256* (2013.01); *H04N 5/247* (2013.01); *G05B 2219/49007* (2013.01); *G06T 2207/10016* (2013.01); *G06T 2207/10028* (2013.01); *G06T 2207/30164* (2013.01)

(58) Field of Classification Search
CPC ............ B23K 37/0235; B23K 37/0256; B23Q 17/2404; B23Q 17/2409; B23Q 17/249; G05B 19/401; G05B 19/4207; G05B 2219/49007; G06T 7/0004; G06T 2207/10016; G06T 2207/10028; H05H 1/34; H05H 1/36
USPC .............. 219/12.55, 121.54, 121.56, 121.58, 219/121.48, 121.67, 121.7, 121.83, 219/121.82, 121.78
See application file for complete search history.

(56) References Cited

U.S. PATENT DOCUMENTS

| | | | |
|---|---|---|---|
| 9,399,266 B2* | 7/2016 | Trevisan | B23K 26/0823 |
| 9,483,047 B2* | 11/2016 | Eckley | G05B 19/41875 |
| 2006/0186100 A1* | 8/2006 | Philipp | B23K 26/0604 |
| | | | 219/121.76 |
| 2010/0326966 A1* | 12/2010 | Hwang | B01F 3/02 |
| | | | 219/121.55 |
| 2011/0316977 A1* | 12/2011 | Pienaar | G05B 19/4068 |
| | | | 348/46 |
| 2014/0069895 A1* | 3/2014 | Brine | B23K 10/00 |
| | | | 219/121.44 |
| 2015/0039121 A1* | 2/2015 | Hermary | G05B 19/4097 |
| | | | 700/163 |
| 2015/0049186 A1* | 2/2015 | Pettersson | G01B 21/047 |
| | | | 348/135 |
| 2017/0001255 A1* | 1/2017 | Winn | B23K 10/006 |

* cited by examiner

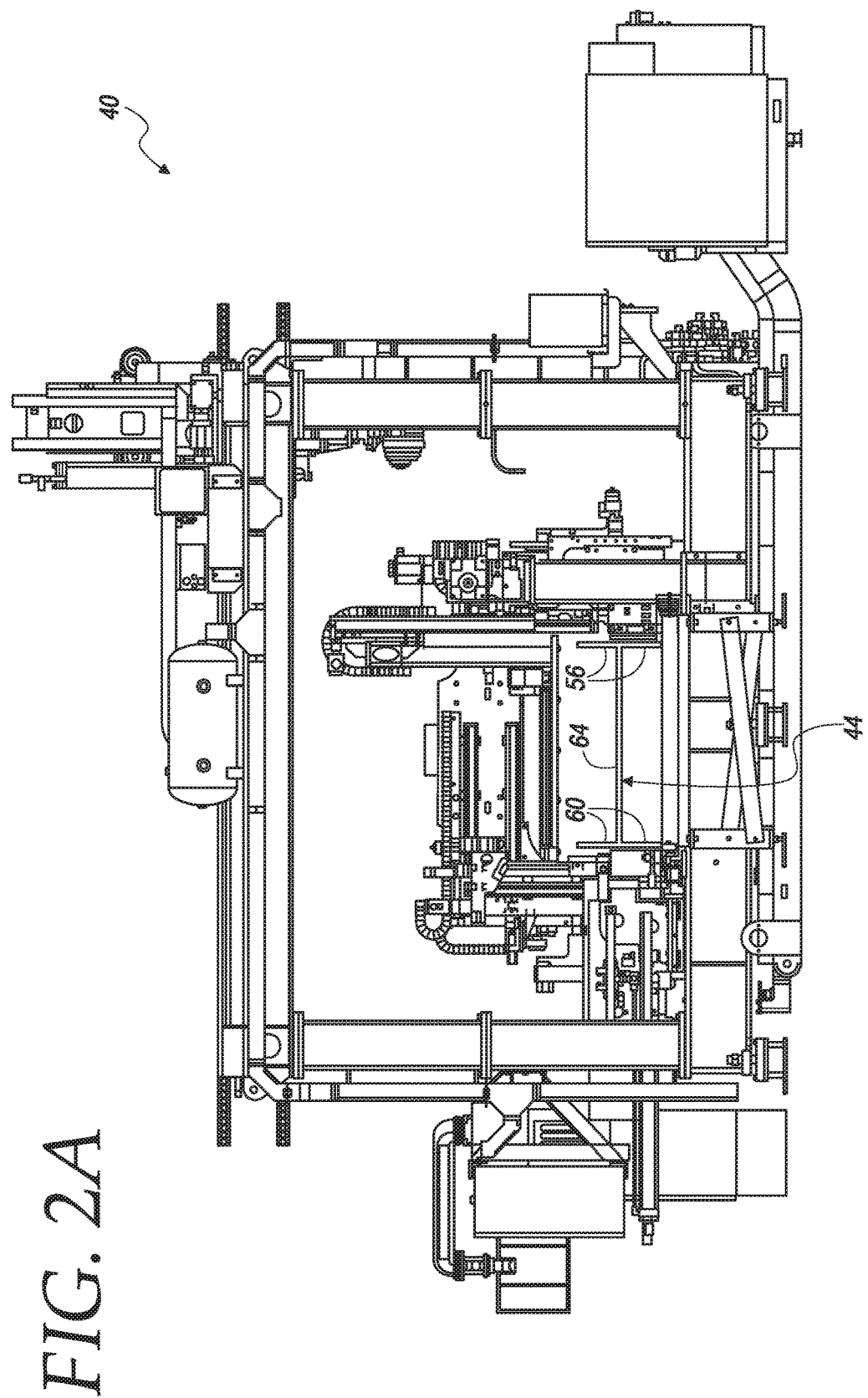

SYSTEM FOR PROCESSING A WORKPIECE

CROSS-REFERENCE TO RELATED APPLICATIONS

This application claims priority of U.S. Provisional Patent Application Ser. No. 62/252,895, filed Nov. 9, 2015, which is incorporated herein by reference in its entirety.

TECHNICAL FIELD

This invention relates to a system for processing of a workpiece. Such processing may involve conveying and severing a length of stock (including, for example, a piece of structural steel) into one or more shorter length segments, cutting, drilling, or punching holes, cutting profiles with a torch, layout marking, etc. More particularly, one aspect of this invention relates to a processing system capable of locating, in three-dimensional space, a workpiece surface (e.g., surface of a leading end, a trailing end, and/or a side portion of stock) for use with subsequent processing of the workpiece. Another aspect of this invention relates to subsequent processing of the workpiece. Yet another aspect of this invention relates to monitoring of a parameter relating to workpiece processing with a cutting torch.

BACKGROUND OF THE INVENTION AND

Technical Problems Posed by the Prior Art

Fabrication of a workpiece (such as, for example, a structural steel I-beam, wide flange H-beam, angle, channel, flat plate, etc.) may require layout marking, cutting, drilling, punching, and/or severing portions of the workpiece. Conventional machines can perform one or more of these processing jobs or operations. For example, a machine can be used to drill holes in a workpiece (e.g., a structural beam) or cut part of the workpiece with a cutting torch.

In one type of machine, a workpiece, such as a structural beam, is supported lengthwise on, and clamped to, a table or conveyor adjacent a drill carriage which supports a drill spindle so that a drill mounted thereto can be moved to desired locations along the length of the beam, along the height of the beam, and toward or away from the beam.

In some machines, the drill spindle can also be tilted (angled) in a plane that is perpendicular to the length of the beam support table and/or can be tilted (angled) in a plane that is parallel to the horizontal support surface of the beam support table.

In another type of machine, the beam or other workpiece is moved through an assembly of tools (e.g., punches, drills, cutting torches, etc.) which are at fixed locations along the length of the machine Structural beams may have to be provided in appropriate lengths for being erected in specific structures. Methods for creating one or more shorter segments or beams from a length of stock include severing the shorter segments from the length of stock with a cutting torch or with a shearing apparatus. When beams are erected in structures, the ends of the beams and/or other portions of the beams are typically connected together with bolts. The bolts are received in holes provided in the webs and flanges of the beams.

Conventional methods for providing the bolt holes in a beam include drilling the holes with one or more drill spindles, or punching the holes with one or more punch presses. For example, "web" punch presses may be used to provide holes in the beam web, and "flange" punch presses may be used to provide holes in the beam flanges. Such punch presses may have conventional designs well-known to those skilled in the art. Various designs are disclosed in U.S. Pat. Nos. 4,631,996, 3,722,337, and 3,720,125.

Other systems for processing a beam or other workpiece may include apparatus having oxygen acetylene torches or plasma torches for cutting the workpiece to length or cutting a profile in the workpiece. Various processes may be combined in one machine, or in one processing line having a number of different machines in series.

Still other recent systems for processing a beam or other workpiece may include an industrial robot or multi-axis robotic arm capable of maneuvering around the workpiece in three-dimensional space, the robot having one or more tools for processing the workpiece.

There is typically a need, at some point in the process (usually at an initial stage of the process), to determine the location of the workpiece relative to the processing line or path (i.e., relative to the various tools that mark, cut, shear, punch, drill, or otherwise process the workpiece at the desired locations along the length of the workpiece). Typically, the location of a leading end edge of a workpiece is determined (i.e., established or located) relative to a predetermined or datum position of the operating tool or tools and/or relative to a fixed portion of the process line or machine in the process line so that subsequent processing operations can be programmed and/or performed relative to the initial location data of the leading end edge of the workpiece. In some processes, the location of the trailing end edge of a workpiece may instead, or subsequently, be determined (i.e., determined relative to the operating tools). In some other processes, the location of a lateral edge or edges of a workpiece must be determined.

In a typical workpiece processing system or processing line, the ambient environment or atmosphere may be relatively dirty as a result of sloughing of rust or scale from the workpiece and/or as a result of the production of the chips and smoke from drilling and/or cutting operations. In addition, the ambient atmosphere can typically include spray mist coolant from coolant liquids that are used during drilling or cutting operations. The relatively dirty ambient atmosphere around the workpiece must be accommodated by any system employed for determining the locations of portions (e.g., edges, surfaces, features) of a workpiece.

Mechanical systems for detecting the location of a workpiece by direct physical contact have been used in the past and continue to be used today. Such mechanical systems do not need to "see" through the dirty ambient atmosphere that envelopes the workpiece, but such mechanical systems are nevertheless subject to the effects of particulates, gases, and liquid materials that are present in the environment around the workpiece and that may over time foul operating components.

A typical mechanical system for locating an edge of a workpiece includes a spring-loaded mechanical switch that physically engages the workpiece. However, this subjects the switch component or components to physical wear and to potential physical damage. Such a mechanical system also requires a significant amount of room (typically for accommodating a support arm, springs, electronic switches to sense motion, etc.). Such a mechanical system thus typically needs to be offset from the operating tool (e.g., drill, cutting torch, etc.). This may require the machine to be longer and/or to require the workpiece or tool to undergo extra travel.

Some of the above-discussed disadvantages of a mechanical system for locating the edge of a workpiece can be eliminated or minimized by using an optical system employing a light beam directed transversely into the processing path of the workpiece so that the beam is perpendicular to the length of the workpiece and parallel to the width direction of the workpiece. When the light beam is interrupted by the leading edge of the workpiece, the light beam is reflected by the surface of the workpiece back to a sensor (e.g., a photoelectric cell switch) near the light source. This actuates the switch for indicating the location of the workpiece leading edge. In such a system, the light-emitting source must be very near the workpiece path because smoke, mist, and chips can interfere with the transmission of the light beam that is directed at, and reflected from, the workpiece. Further, color and/or texture changes in the workpiece materials, along with changes in the distance between the workpiece and the switch, can cause problems in actuating the switch with the reflected light beam. Such a reflected light beam type of switching system may thus be somewhat inaccurate and/or unreliable.

With the aforementioned optical or mechanical location systems for processing workpieces, the systems are generally limited to detecting edges or are limited to touching a few points on the surface of a workpiece. Such limited sensing capabilities of the location systems can lead to inaccuracies in the processing of the workpiece because such systems fail to detect the majority of the workpiece surface in order to perform the particular process (e.g., cutting, drilling, etc.). Failure to detect the workpiece surface accurately can lead to performing processes on the workpiece that are not in the desired location, in three-dimensional space, on the workpiece. Such systems may also fail to detect differences between the actual workpiece being processed and an idealized three-dimensional representation or computer-aided design and computer aided manufacturing (hereinafter "CAD/CAM") representation of the workpiece. Therefore, it would be desirable to locate the surface of a workpiece with a greater degree of accuracy and repeatability, and to do so efficiently and quickly for purposes of mass processing of workpieces.

In some current workpiece processing systems, there may be little or no intelligent control and/or intelligent sensing of the usage of processing tools (and torch gases, where employed) used in cutting, coping, and marking processes. Lack of such control or sensing can lead to increased wear on the processing tools, clogging and blockage of the processing tools, and waste of torch gases used in cutting, coping, and marking processes.

It would be desirable to provide an improved system for processing a workpiece wherein the above-discussed problems could be eliminated, or at least substantially minimized.

It would further desirable to provide an improved system for processing a workpiece wherein the location of the workpiece could be ascertained with a greater degree of accuracy to account for surface variability in workpieces.

It would be especially beneficial if such an improved system could operate effectively to locate a workpiece surface or surfaces in an environment that is dirty, and wherein drill chips and spray mist coolant might be thrown or dispersed around the workpiece.

Such an improved system should preferably eliminate or minimize the likelihood of the workpiece or other objects in the environment from physically impacting or engaging the workpiece location system in a way that could have a deleterious effect on the system.

It would also be desirable if such an improved system could be readily operated by an appropriate control system, could accommodate a variety of different types of workpieces (e.g., flat plates, channels, angles, beams, etc.), could produce accurate and repeatable results, and could relatively easily accommodate changes in the types and sizes of the workpieces being processed.

Also, it would be beneficial if such an improved system could employ components that are relatively small and that are relatively easy to fit in an existing processing machine or line.

It would further be beneficial if such an improved system could perform processing operations or jobs quickly and efficiently.

Further, it would be advantageous if the improved system could be manufactured, installed, and operated without incurring excessive costs or expenses.

SUMMARY OF THE INVENTION

The present invention provides a novel, improved system and methods for processing a workpiece and that can accommodate designs having the above-discussed benefits and features.

According to one aspect of the invention, a system is disclosed for processing a workpiece. The system has a support surface for supporting a workpiece and defining a processing path. The system has a processing tool that is movable with respect to the processing path. The system further has a sensor carriage that is movable along a scan axis. The sensor carriage has at least one light source that is located to emit a light beam at an angle to the scan axis and onto a target surface of a workpiece. The sensor carriage further has at least one camera that is configured to record the location data of the light beam on a target surface of a workpiece as the sensor carriage moves along the scan axis. The system further has a control system for generating a three-dimensional point representation of a workpiece surface from the light beam location data. The control system controls the movement of the processing tool based on the three-dimensional point representation of a workpiece.

In still another form of the invention, a method of processing a workpiece is disclosed. The method includes the step of acquiring the system discussed in the preceding paragraph. The method further includes the step of loading a workpiece onto the support surface of the system. The method includes the step of moving the sensor carriage along the scan axis adjacent the workpiece. The method further includes the step of emitting a light beam at an angle to the scan axis onto a target surface of the workpiece. The method includes the step of recording the location data of the light beam on the target surface of the workpiece with the least one camera. The method further includes the step of generating a three-dimensional point representation of at least a portion of the workpiece surface. The method includes the further step of moving the processing tool based on the three-dimensional point representation of a portion of the workpiece surface.

In another form of the invention, a system is disclosed for processing a workpiece. The system has a support surface for supporting a workpiece and defining a processing path. The system has a processing tool that is movable with respect to the processing path. The system further has a gas mixture system to control a gas used by the processing tool. The gas mixture system controls the flow of a gas based on the historical three dimensional coordinates of the processing tool.

In still another form of the invention, a method of processing a workpiece is disclosed. The method includes the step of acquiring the system discussed in the preceding paragraph. The method further includes the step of loading a workpiece onto the support surface of the system. The method includes the step of moving the processing tool to perform a processing operation on the workpiece. The method includes the further step of controlling the flow of a gas used by the processing tool based on historical three dimensional coordinates of the processing tool.

In yet another form of the invention, a system is disclosed for processing a workpiece. The system has a support surface for supporting a workpiece and defining a processing path. The system has a processing tool that is movable with respect to the processing path. The system further has a gas mixture system to control a gas used by the processing tool. The gas mixture system has a plurality of pressure sensors and a recording system for collecting historical pressure data of a gas. The gas mixture system is configured to (i) compare current gas pressure data to historical gas pressure data and (ii) detect at least one of wear of the processing tool, blockage of the processing tool, and clogging of the processing tool.

In still another form of the invention, a method of processing a workpiece is disclosed. The method includes the step of acquiring the system discussed in the preceding paragraph. The method further includes the step of loading a workpiece onto the support surface of the system. The method includes the step of moving the processing tool to perform a processing operation on the workpiece. The method includes the further step of detecting at least one of: wear of the processing tool; blockage of the processing tool; and clogging of the processing tool based on the historical pressure data of a gas used by the processing tool.

In yet another form, a system is disclosed for processing a workpiece. The system has a sensor carriage that is movable along a scan axis. The sensor carriage has at least one light source that is located to emit a light beam at an angle to the scan axis and onto a target surface of a workpiece. The sensor carriage further has at least one camera that is configured to record the location data of the light beam on a target surface of a workpiece as the sensor carriage moves along the scan axis. The system further has a control system for generating a three-dimensional point representation of a workpiece surface from the light beam location data. The control system controls the movement of a processing tool based on the three-dimensional point representation of a workpiece.

In yet another form, a system is disclosed for processing a workpiece. The system has a gas mixture system to control a gas used by a processing tool. The gas mixture system controls the flow of a gas based on the historical three dimensional coordinates of the processing tool.

In yet another form, a system is disclosed for processing a workpiece. The system has a gas mixture system to control a gas used by a processing tool. The gas mixture system has a plurality of pressure sensors and a recording system for collecting historical pressure data of a gas. The gas mixture system is configured to (i) compare current gas pressure data to historical gas pressure data and (ii) detect at least one of wear of the processing tool, blockage of the processing tool, and clogging of the processing tool.

BRIEF DESCRIPTION OF THE DRAWINGS

Numerous other advantages and features of the present invention will become readily apparent from the following detailed description of the invention, from the claims, and from the accompanying drawings.

In the accompanying drawings that form part of the specification, and in which like numerals are employed to designate like parts throughout the same, FIG. 1 shows a workpiece, in the form of an I-beam, loaded into the system for subsequent processing;

FIG. 2A is a front elevation view of the system shown in FIG. 1;

FIG. 9 shows the scanning assembly in a stored configuration;

FIG. 10 shows the scanning assembly in a deployed configuration;

FIG. 11 shows the scanning assembly actively scanning a workpiece;

FIG. 12 shows an industrial robot processing a workpiece;

FIG. 12A shows only the scanning assembly system components, and FIG. 12A shows the left side scanner unit in a stored configuration while the other scanner units are shown in a deployed configuration;

DESCRIPTION OF THE PREFERRED EMBODIMENT

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the machine or processing system operating in accordance with this invention is described in the normal (upright) operating position, and terms such as above, below, left, right, etc., are used with reference to this position. It will be understood, however, that the system of this invention may be manufactured, stored, transported, used, and sold in an orientation other than that described.

The system operating in accordance with the process of this invention can have certain conventional components and control mechanisms the details of which, although not fully illustrated or described, will be apparent to those having skill in the art and an understanding of the necessary functions of such components and mechanisms.

Some of the Figures illustrating an embodiment of the processing system operating in accordance with the present invention show conventional structural details and mechanical elements that will be recognized by one skilled in the art. However, the detailed descriptions of such elements are not necessary to an understanding of the invention, and accordingly, are herein presented only to the degree necessary to facilitate an understanding of the novel features of the present invention.

Figure 1:
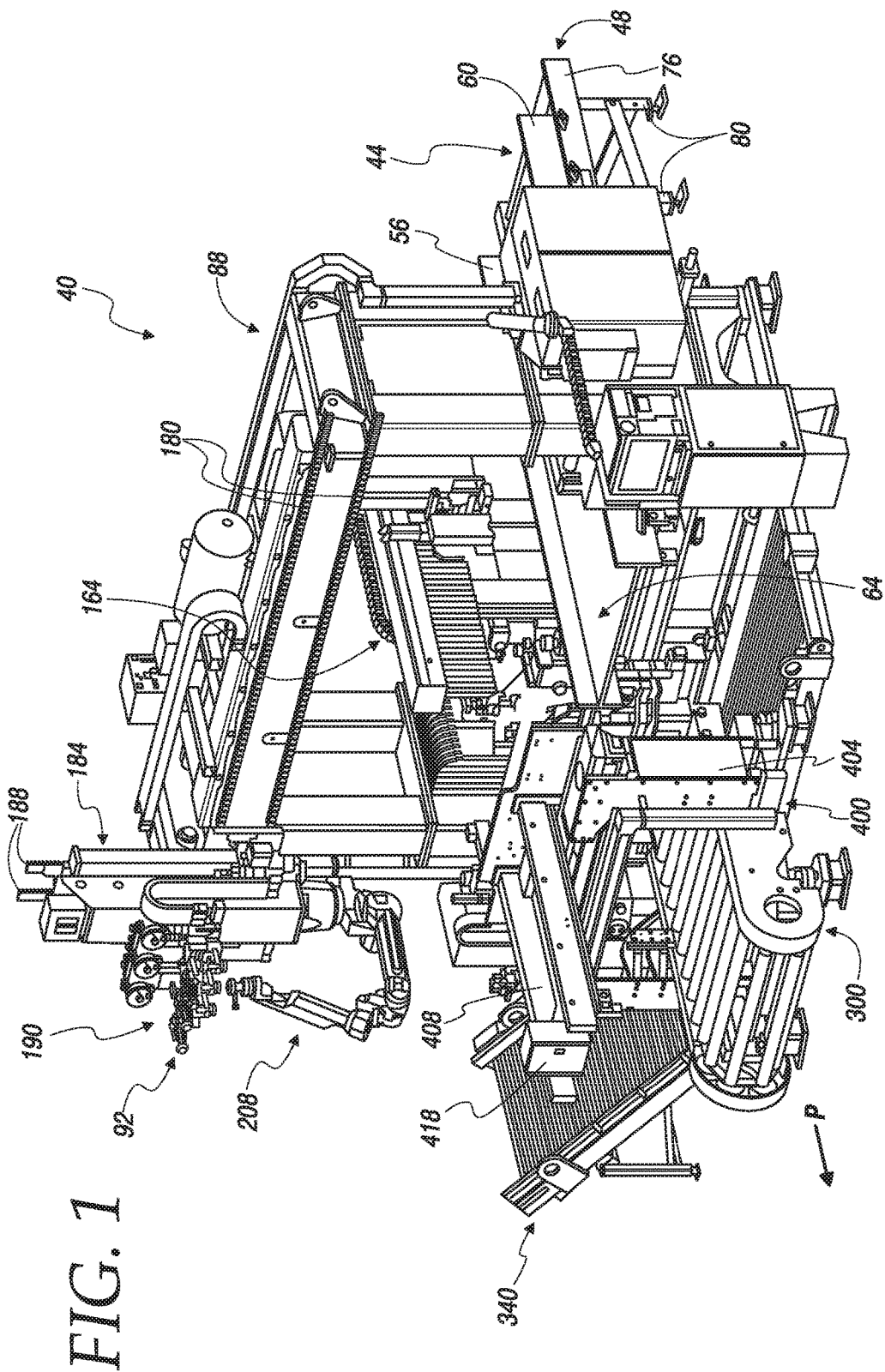
FIG. 1 is a perspective view, looking at the rear, exit end of a system for processing a workpiece according to the present invention.
Figure 2:
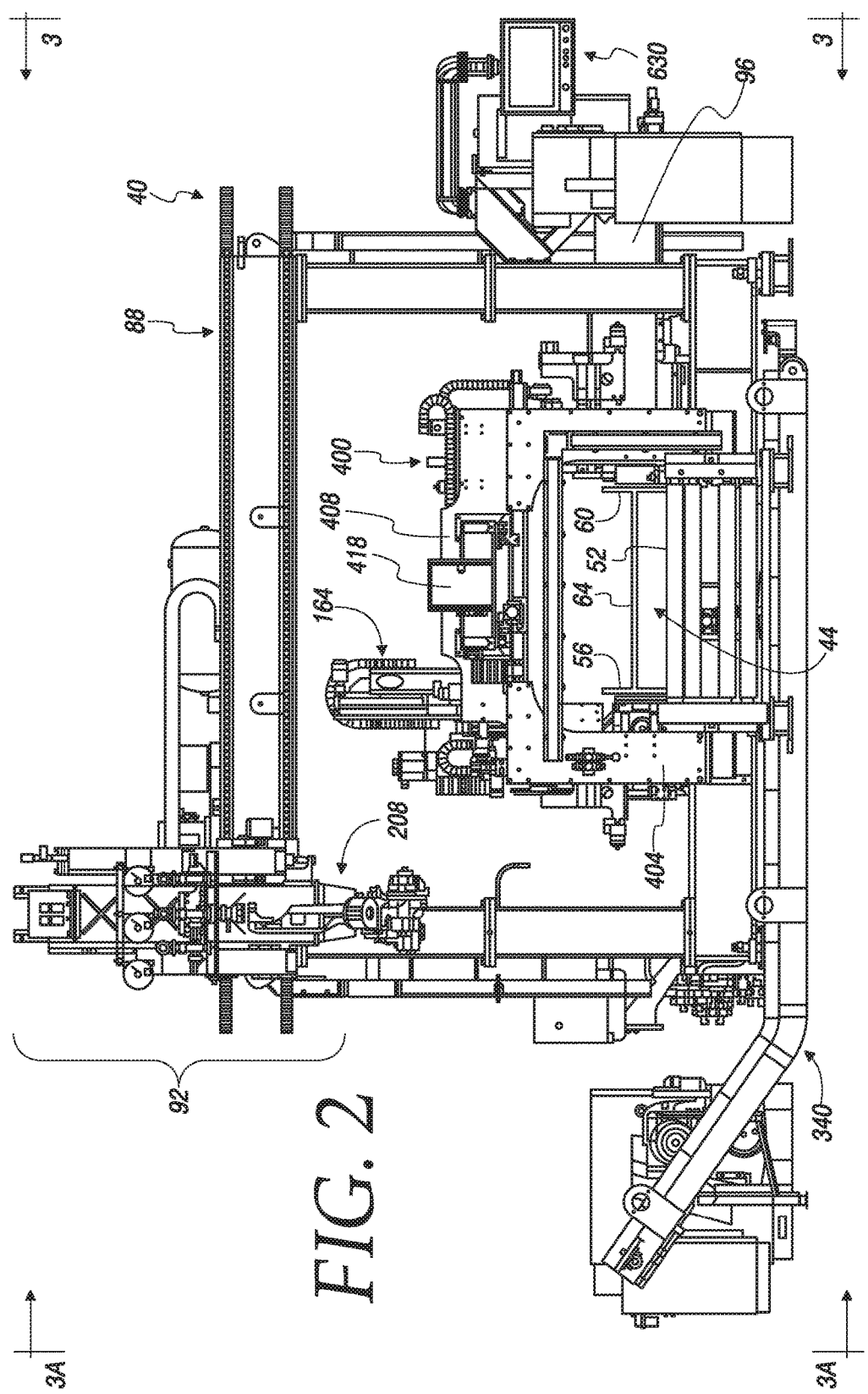
FIG. 2 is a rear elevation view of the system of FIG. 1.
Figure 3:
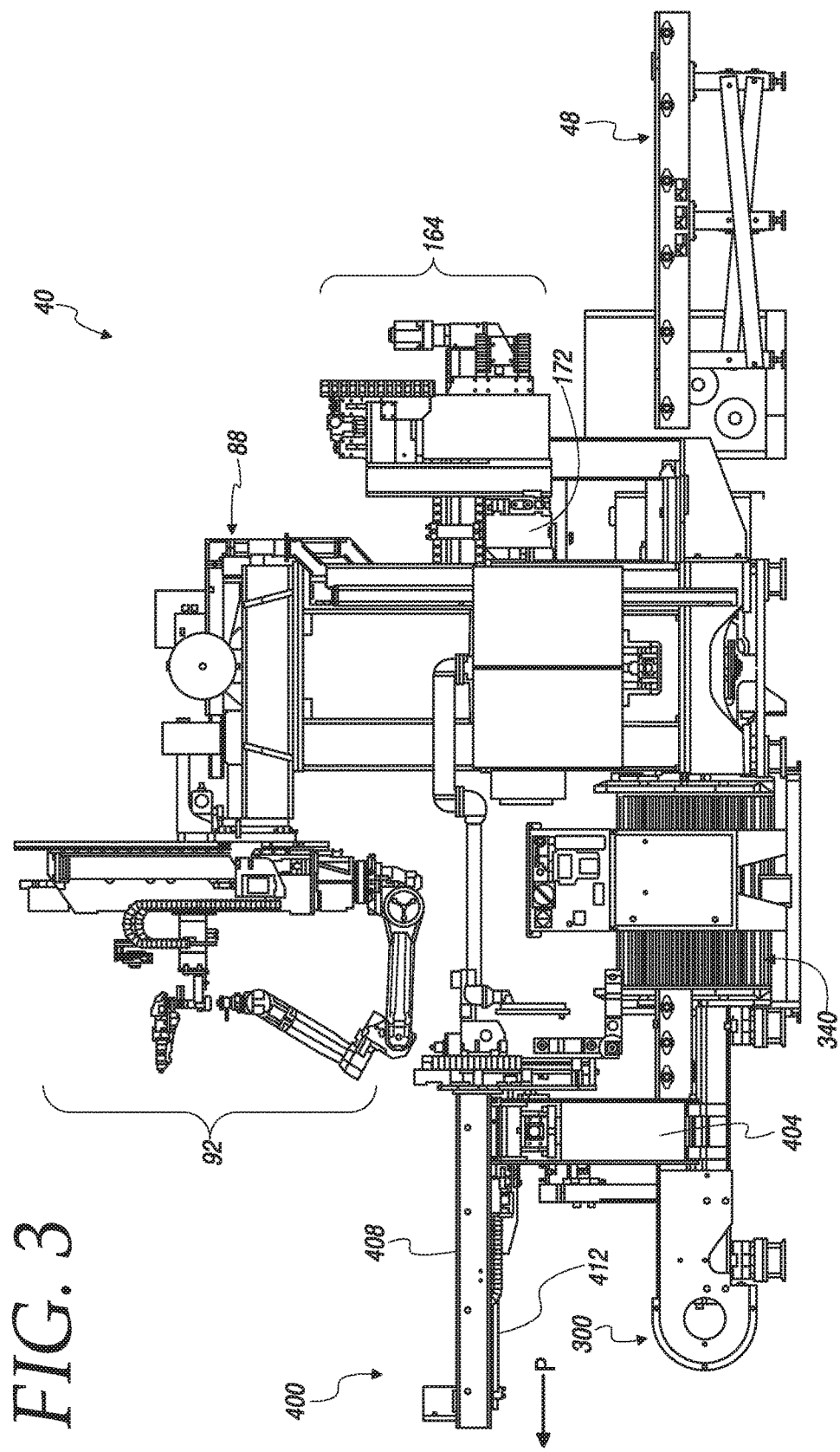
FIG. 3 is a side elevation view of the system taken along the plane 3-3 in FIG. 2, however in FIG. 3 the workpiece is not shown.
Figure 3A:
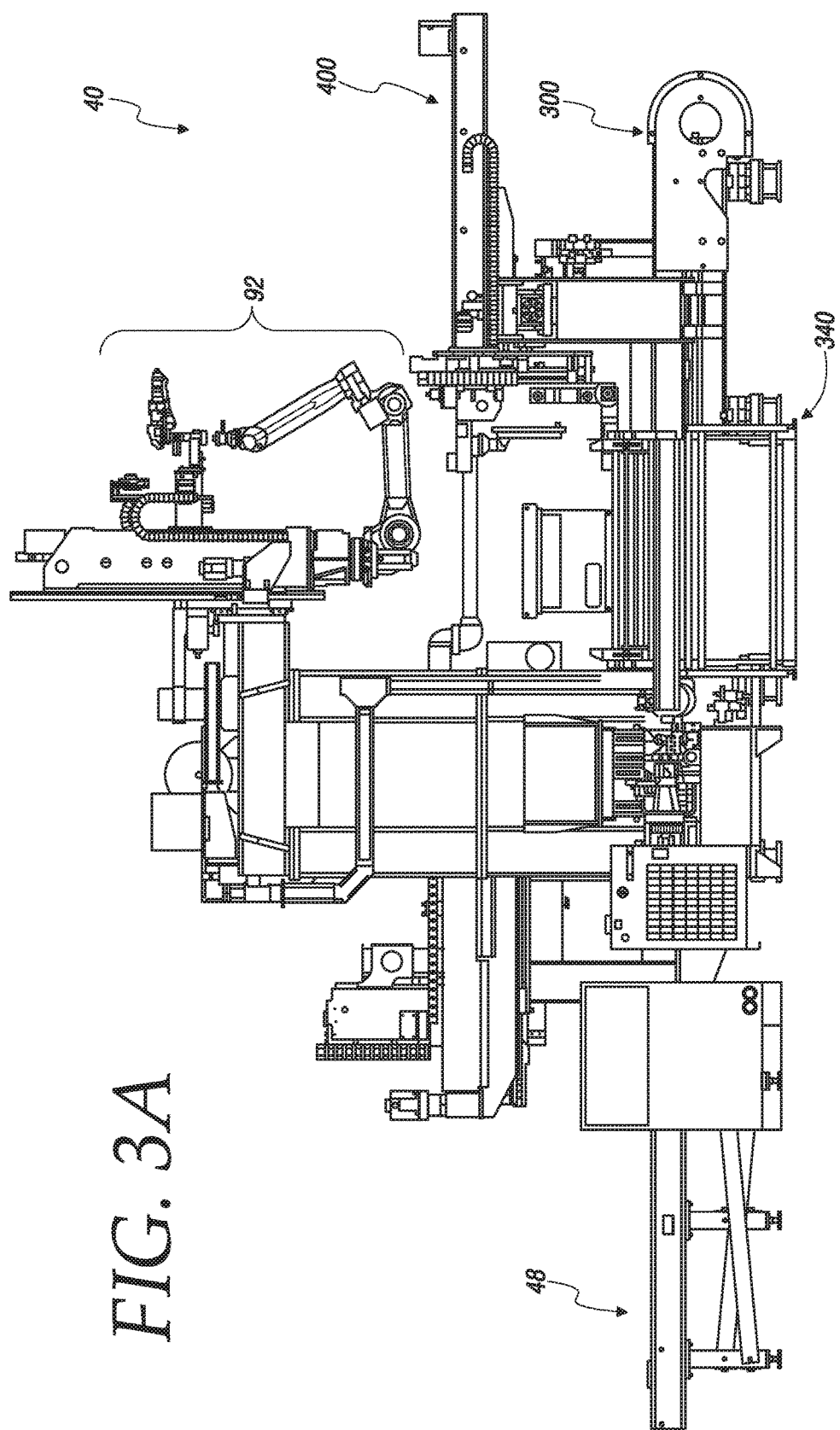
FIG. 3A is a side elevation view taken along the plane 3A-3A in FIG. 2, however in FIG. 3A the workpiece is not shown.

FIG. 1 shows a processing machine or system 40 according to the present invention for processing a structural steel beam that is generically referred to herein as a workpiece 44. For ease of illustration, some of the ancillary electrical wiring and gas hosing of the system 40 has been omitted. The system includes an inlet conveyor 48 having a support surface defined by a plurality of spaced-apart, parallel rollers 84 and upon which a length of stock, such as a structural steel beam or other workpiece 44, can be initially positioned by a forklift, conveyor, crane or other means. The particular workpiece 44 illustrated in FIG. 2A is an I-beam having a first, right side flange 56, a second, left side flange 60, and a central web 64 connecting the two flanges 56, 60.

Figure 8:
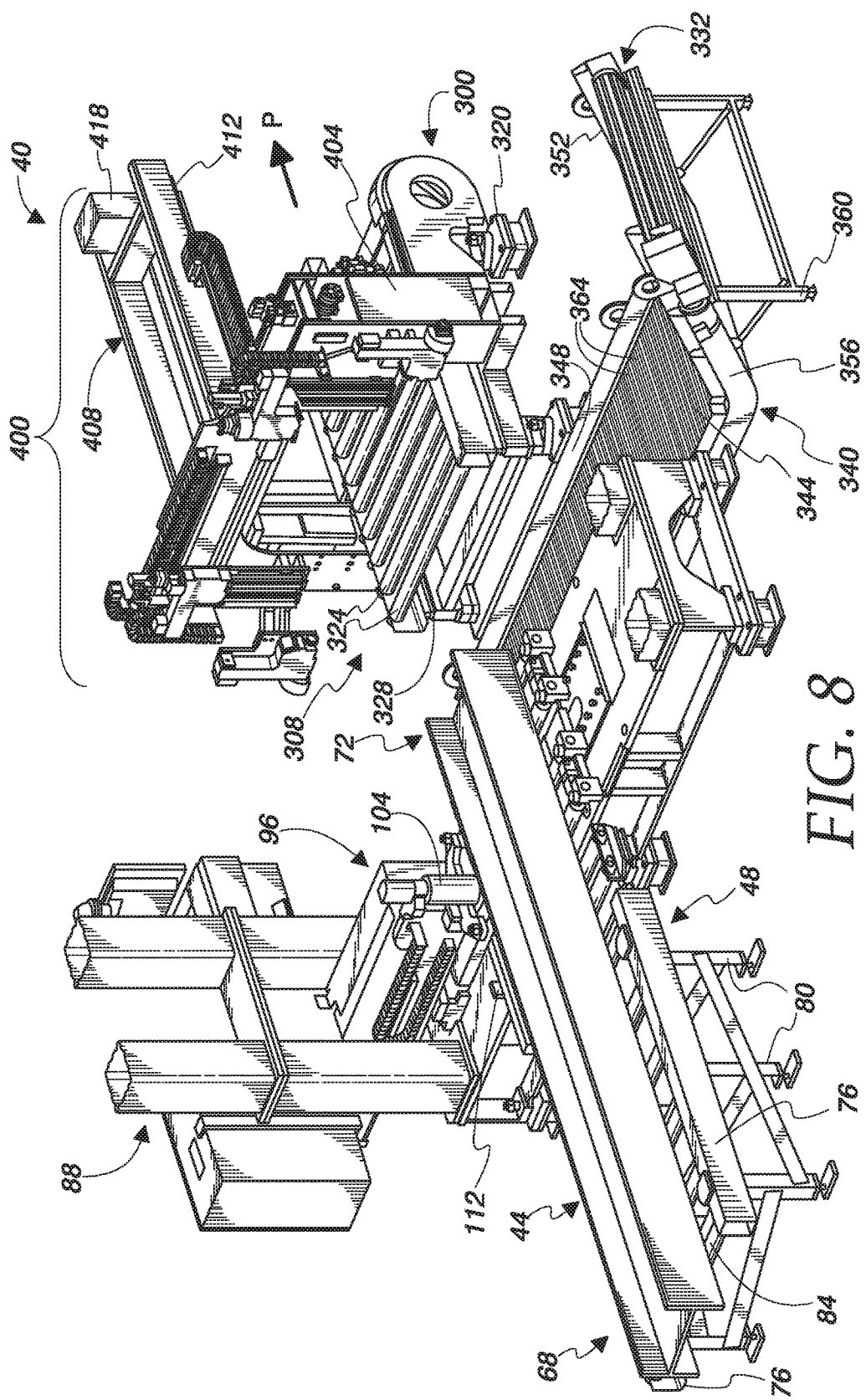
FIG. 8 is a fragmentary, perspective view, looking toward the front of the system shown in FIG. 1, however in FIG. 8 the workpiece is not shown and some of the components have been broken away to reveal underlying, interior detail.

Referring to FIG. 8, the inlet conveyor 48 has an inlet end 68, an outlet end or exit end 72, and generally defines a processing path "P" between the inlet end and 68 and outlet end 72 for conveying the workpiece 44 for processing. The inlet conveyor 48 includes two horizontally disposed, spaced-apart frame members or side walls 76 supported by a plurality of legs 80. The side walls 76 support the rollers 84 positioned therebetween. The rollers 84 each include an end sprocket engaged by an endless chain that is hydraulically driven (not visible in FIG. 8) in order to index or move the workpiece 44 forward or rearward along the processing path "P". It will be understood that the inlet conveyor 48 may be any suitable conventional or special type (e.g., the roller type illustrated, a belt conveyor, etc.) and the conveyor may be driven by any other conventional engine, motor, or system, the details of which form no part of the present invention.

Referring to FIG. 1, the system 40 includes a frame or gantry 88 extending over the inlet conveyor 48. The gantry 88 supports a processing tool or processing tool assembly 92 for processing the workpiece 44 (e.g., cutting, coping, marking the workpiece, etc.), which will be discussed in greater detail hereinafter.

Figure 4:
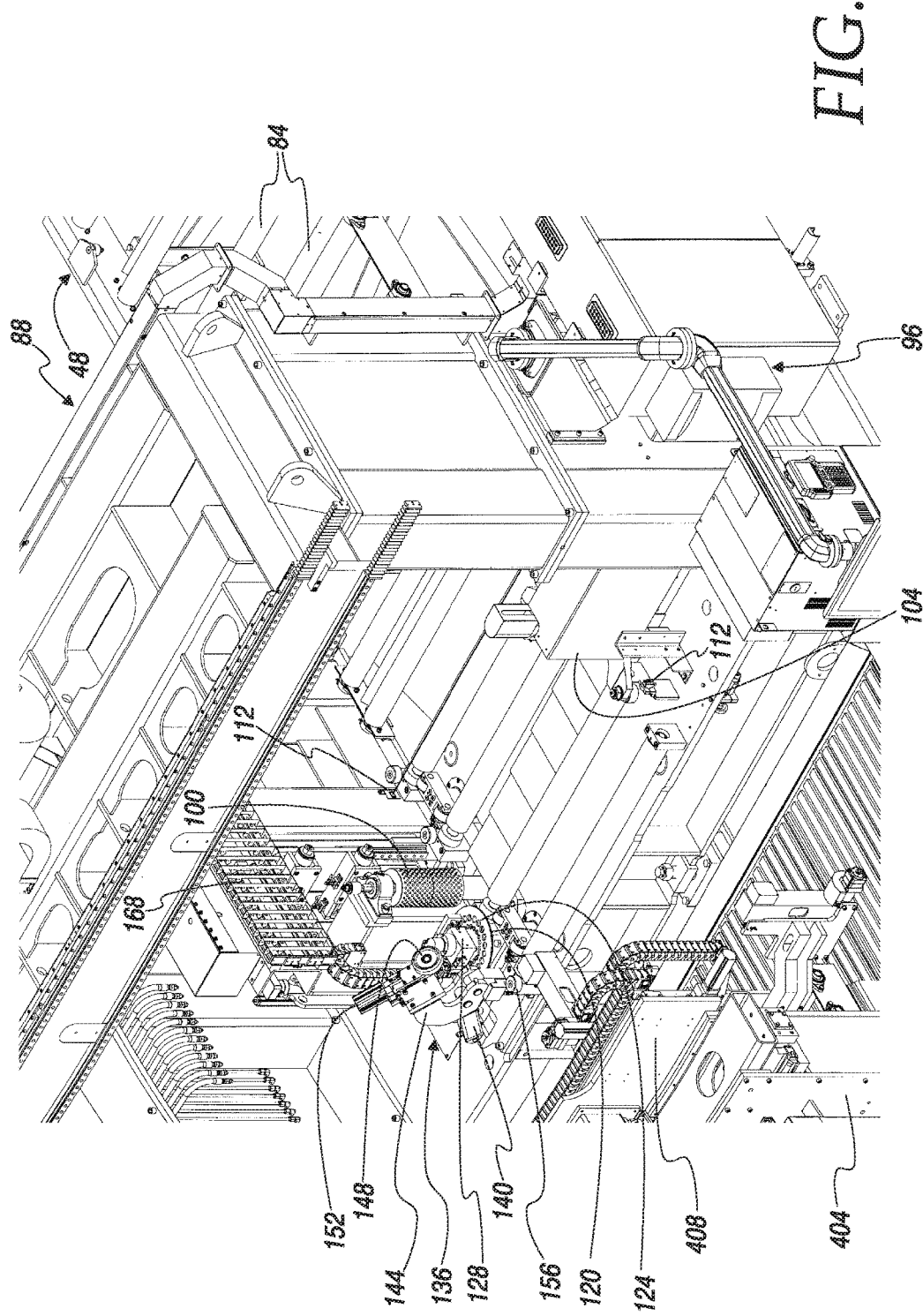
FIG. 4 is a partial, fragmentary, enlarged, perspective view of a rear portion of the system shown in FIG. 1, however in FIG. 4 the workpiece is not shown.

With reference to FIG. 4, the gantry 88 is provided with a hydraulically actuated clamp assembly 96 for holding the workpiece 44 (FIG. 2) at a fixed location along a datum line with respect to the gantry 88. The clamp assembly 96 has a datum or first clamping surface 100 and a second clamping surface 104 that is hydraulically movable toward the first clamping surface 100. Specifically, the second clamping surface 104 (FIG. 8) is movable horizontally in a direction that is generally perpendicular to the processing path "P" (FIGS. 1 and 8). The first clamping surface 100 (FIG. 4) has the form of a vertical roller that is connected to one side of the gantry 88. The second clamping surface 104 (FIG. 8) also has the form of a vertical roller. With the workpiece 44 clamped between the first and second clamping surfaces (i.e., rollers) 100 and 104, respectively, the system 40 can precisely locate the workpiece 44 against the datum while moving the workpiece 44 forward or rearward along the processing path "P" via the driven conveyor rollers 84. The clamp assembly 96 is further provided with a linear transducer (not visible) which enables the control application (discussed in detail herein) to sense the location of the clamp assembly 96 against the workpiece 44. The linear transducer provides a feedback means to the application to prevent potential over-clamping of the workpiece 44.

Still referring to FIG. 4, the gantry 88 has a series of laser switches or sensors 112 and associated reflectors configured to detect the location of a leading end and/or trailing end of the workpiece 44 as it moves into, through, and out of the system 40. The laser sensors 112 are positioned generally disposed horizontally and are oriented generally perpendicular to the processing path "P", with the laser sensors 112 affixed on one side of the gantry 88 and the associated reflectors affixed on an opposite side of the gantry 88. The detailed operation of the laser sensors 112 will be discussed herein.

With reference to FIG. 4, the gantry 88 has a roller measurement assembly 120 for measuring the length of the workpiece 44 to provide accurate recordation the feeding or movement of the workpiece 44 through the system 40 along the processing path "P". The measurement assembly 120 is comprised of a spring-loaded encoder wheel 124 and an encoder sensor 128. The spring loading of the encoder wheel 124 ensures that the encoder wheel 124 stays in constant contact with the side surface of a workpiece 44. The detailed operation of the roller measurement assembly 120 will be discussed herein.

Still referring to FIG. 4, the gantry 88 may be provided with an angle clamp assembly 136 for use with clamping a workpiece that is in the form of an L-beam (not illustrated). The angle clamp assembly 136 has a hydraulic piston 140 connected between the gantry 88 and a rotatable linkage 144. The linkage 144 is further provided with a clamping roller 148 connected to a motorized rail 152, which is capable of extending the clamping roller 148 onto an inside surface or crest of the L-beam so as to push the L-beam against a datum guide roller 156. The angle clamp assembly 136 provides an additional clamping force specifically when an L-beam is being processed by the system 40.

Figure 5:
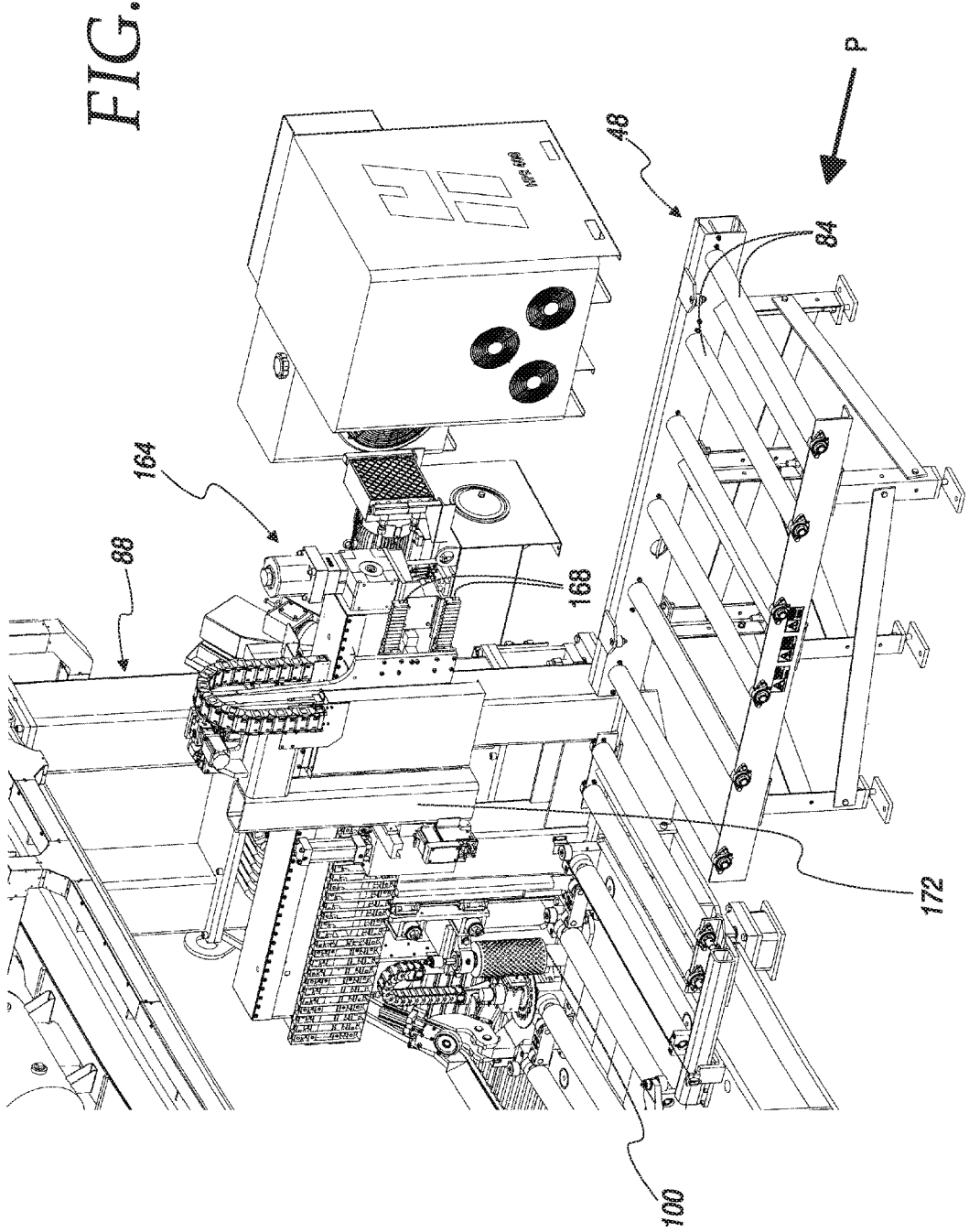
FIG. 5 is a partial, fragmentary, enlarged, perspective view of a front, inlet end of the system shown in FIG. 1, however in FIG. 5 the workpiece is not shown.

Referring next to FIG. 5, the gantry 88 includes a remnant material gripper or pushing assembly 164 for pushing or otherwise moving a workpiece 44 forward along the processing path "P". Generally, the pushing assembly 164 is utilized to move a workpiece 44 forward when the workpiece 44 is not clamped by the clamp assembly 96, such as is the case when the workpiece 44 is positioned partially on a powered outlet conveyor (which will be discussed in detail herein). The pushing assembly 164 is mounted to, and may be driven with respect to the gantry 88 along, a first pair of linear rails 168 extending generally parallel to the processing path "P". The pushing assembly 164 includes a pushing member or abutment member 172 that actually contacts the trailing end of the workpiece 44 and that is further movable vertically up and down along a second pair of linear rails (not visible in FIG. 5) toward or away from the inlet conveyor 48. The detailed operation of the pushing assembly 164 will be discussed herein.

Figure 6:
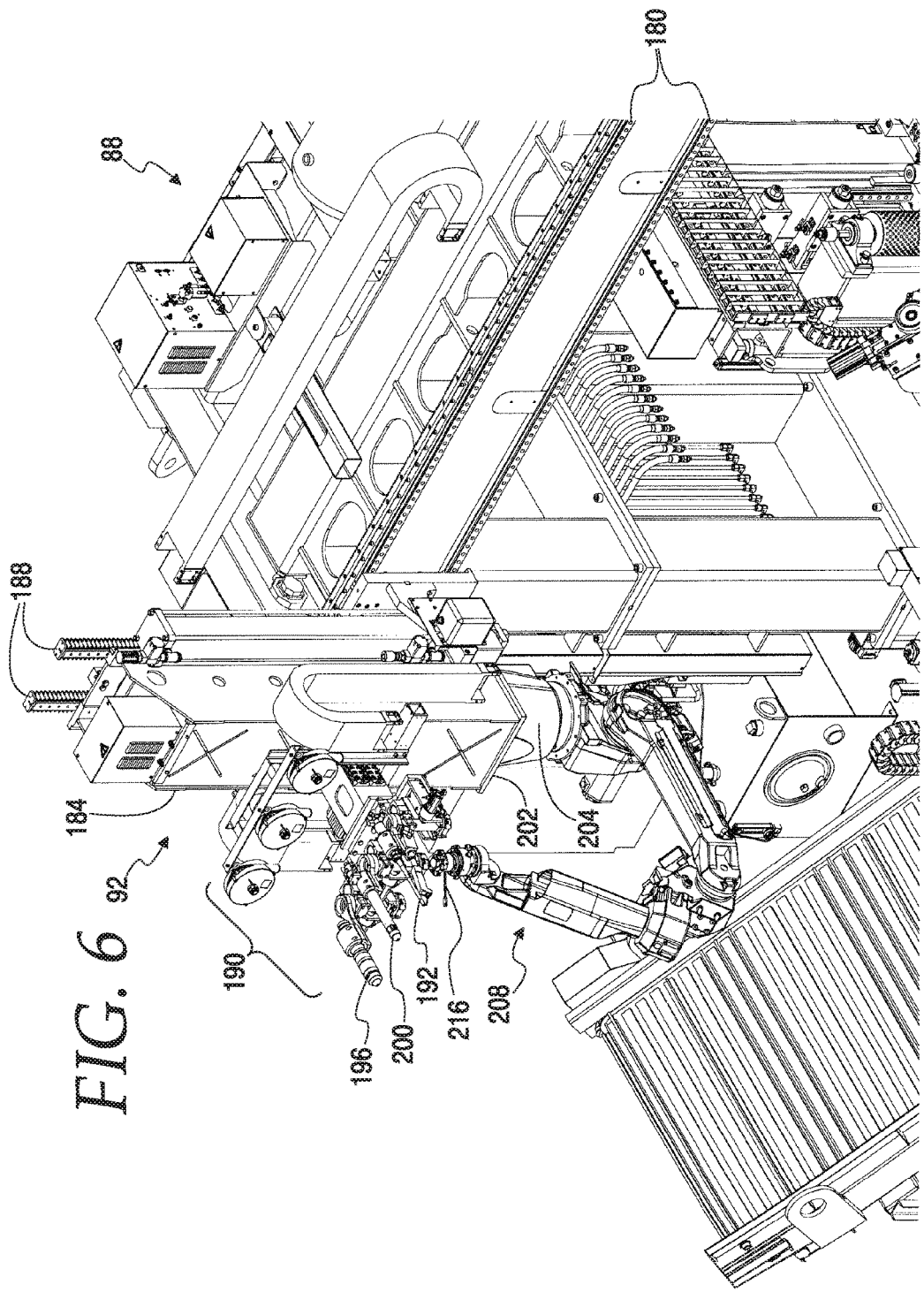
FIG. 6 is another partial, fragmentary, enlarged, perspective view of a rear portion of the system shown in FIG. 1, however in FIG. 6 the workpiece is not shown.
Figure 6A:
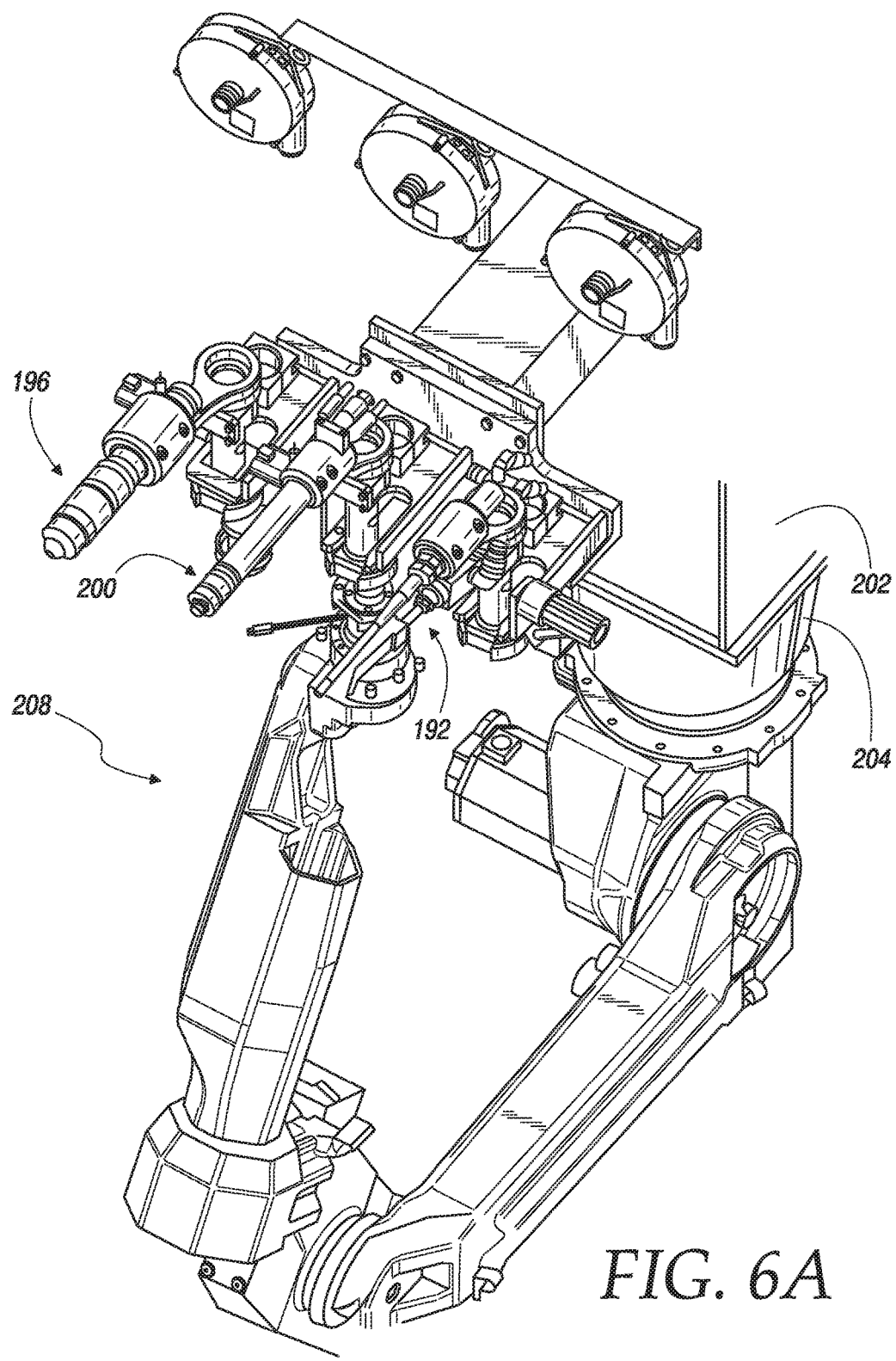
FIG. 6A is a partial, fragmentary, enlarged, perspective view of the industrial robot of the system shown in FIG. 1.

As best shown in FIG. 6, the gantry 88 is connected to the processing tool assembly 92 by a pair of linear rails 180 running generally horizontally along an axis that is perpendicular to the processing path "P". The processing tool assembly 92 has a carriage 184 that is further movable along a second pair of linear rails 188 running generally vertically toward or away from the inlet conveyor 48 (FIG. 1). The carriage 184 defines a docking station 190 that releasably holds a number of processing tools, including an oxygen acetylene torch 192, a plasma cutting torch 196, and a plasma marking torch 200. In one embodiment of the inventive system, the oxygen acetylene torch 192 is an MT5 torch manufactured by Victor Equipment having facilities at 2800 Airport Road, Denton, Tex. 76207, USA, the plasma cutting torch 196 is an HPR460XD torch manufactured by Hypertherm, Inc. having facilities at 21 Great Hollow Road, Hanover, N.H. 03755, USA, and the plasma marking torch 200 is an Arcwrite HT084005 torch also manufactured by Hypertherm, Inc. It will be appreciated that the docking station 190 may hold any number or type of workpiece processing tools for cutting, coping, marking, drilling, or otherwise modifying a stock workpiece 44 (FIG. 1).

With reference to FIG. 6, the carriage 184 is further provided with a lower mounting surface 202 to which a base portion 204 of a multi-axis robot arm or industrial robot 208 is affixed. The industrial robot 208 has a plurality of independently movable members, each rotatable about an axis by an electric motor. The distal-most movable member terminates in an end effector or universal attachment 216. The universal attachment 216 is utilized for mating with, or otherwise attaching to, an attachment portion of any one of the oxygen acetylene torch 192, the plasma cutting torch 196, and the plasma marking torch 200 or any other tool that may be provided in the docking station 190. The detailed operation of the universal attachment 216 will be discussed in detail hereinafter.

The industrial robot 208 may be any suitable conventional or special multi-axis or industrial robot, such as those manufactured by Kuka AG, FANUC, DENSO, and others. In a current embodiment of the inventive system described herein, the industrial robot 208 is an M20ia Foundry Edition robot manufactured by FANUC having facilities at 1800 Lakewood Blvd., Hoffman Estates, Ill. 60192, USA. The design and three-dimensional control of such an industrial robot 208 is known in the art, the details of which form no part of the present invention. Basic design and control of such robots are described generally in U.S. Pat. Nos. 5,550,953 and 8,367,970, each of which is incorporated by reference in its entirety. Generally, the industrial robot 208 has a local coordinate system defined by its stationary base portion 204. The system 40 provides instructions to the industrial robot 208 control software in the form of the local coordinate system of the robot 208, as will be discussed in greater detail herein.

Referring to FIG. 8, the system 40 is further provided with an exit conveyor 300 that is spaced forwardly of both the inlet conveyor 48 and the gantry 88. An empty volume exists between the exit conveyor 300 and the inlet conveyor 48 and is referred to herein as the processing volume within which the workpiece 44 (FIG. 12) is positioned such that the industrial robot 208 (FIG. 12) has three hundred and sixty degrees of access to the workpiece 44.

Still referring to FIG. 8, the outlet conveyor 300 defines a support surface onto which a workpiece 44 can be conveyed from the inlet conveyor 48, and which, in the illustrated embodiment, are defined by a plurality of spaced-apart, parallel rollers 324. The outlet conveyor 300 has an inlet end 308 and an outlet end 312, and is situated generally along the processing path "P". The outlet conveyor 300 includes two horizontally disposed, spaced-apart frame members or side walls 316 supported by a plurality of legs 320, and accommodates the rollers 324 between the walls 316. The rollers 324 each include an end sprocket engaged by an endless chain that is hydraulically driven (not visible in FIG. 8) in order to index or move the workpiece 44 (not shown in FIG. 8) forward or rearward along the processing path "P". It will be understood that the outlet conveyor 300 may be any suitable special or conventional type (including the illustrated roller conveyor or a belt conveyor, etc.) and may be driven by any suitable special or conventional engine or motor or other drive system. A portion of each of the two walls 316 are attached to, and movable along via a motor (not visible), a pair of linear rails 328, which enables each portion of the walls 316 and the milers 324 to extend toward the inlet conveyor 48 and into the processing volume. The extension of a portion of the outlet conveyor 300 into the volume increases the length of the support surface defined by the rollers 324 beneath a workpiece 44 as may be required to move a particular workpiece 44 forward.

Still referring to FIG. 8, beneath the processing volume, and between the inlet conveyor 48 and the outlet conveyor 300, a scrap conveyor system 332 is provided for conveying scrap pieces that may be cut or removed from the workpiece 44. The scrap conveyor system 332 includes a scrap conveyor 340 that defines a support surface 344 onto which cut away or scrap portions of the workpiece 44 can fall and be conveyed away from the system 40. The scrap conveyor 340 is situated generally perpendicular to the processing path "P", and has an inlet end 348 located below the processing volume for the industrial robot 208 (not visible in FIG. 8), and an inclined outlet end 352 that can move scrap to another conveyor or into a scrap bin (not illustrated). The scrap conveyor 340 includes two horizontally disposed, spaced-apart frame members or side walls 356 supported partially by a pair of legs 360, and accommodates a plurality of rollers 364. The rollers 364 each have an end sprocket engaged with an endless chain that is driven by an electric motor (not visible). It will be understood that the scrap conveyor 340 may be any suitable special or conventional type (including the illustrated roller conveyor or a belt conveyor, etc.) and may be driven by any suitable special or conventional engine, motor, or other drive system. Further, the scrap conveyor 340 need not have an inclined portion. Furthermore, the scrap conveyor may be eliminated altogether in some applications.

With reference now to FIGS. 8-12, the system 40 is provided with a scanning assembly 400 for collecting surface information of the workpiece 44 (FIGS. 9-12 only). The scanning assembly 400 includes a fixed, scanning gantry 404 that extends over the outlet conveyor 300 (FIG. 8 only). The scanning assembly 400 further includes a scanning carriage 408 that is movably connected to the scanning gantry 404 by a pair of linear rails 412. The direction of movement of the scanning carriage 408 along the linear rails 412 is referred to hereinafter as the "x-axis" or the "scan axis". The movement of the scanning carriage 408 along the linear rails 412 allows a portion of a workpiece 44, within the processing volume, to be scanned and also permits the industrial robot 208 (FIG. 12 only) to perform processing operations on the workpiece 44 within the volume, as will discussed in detail later.

Figure 9:
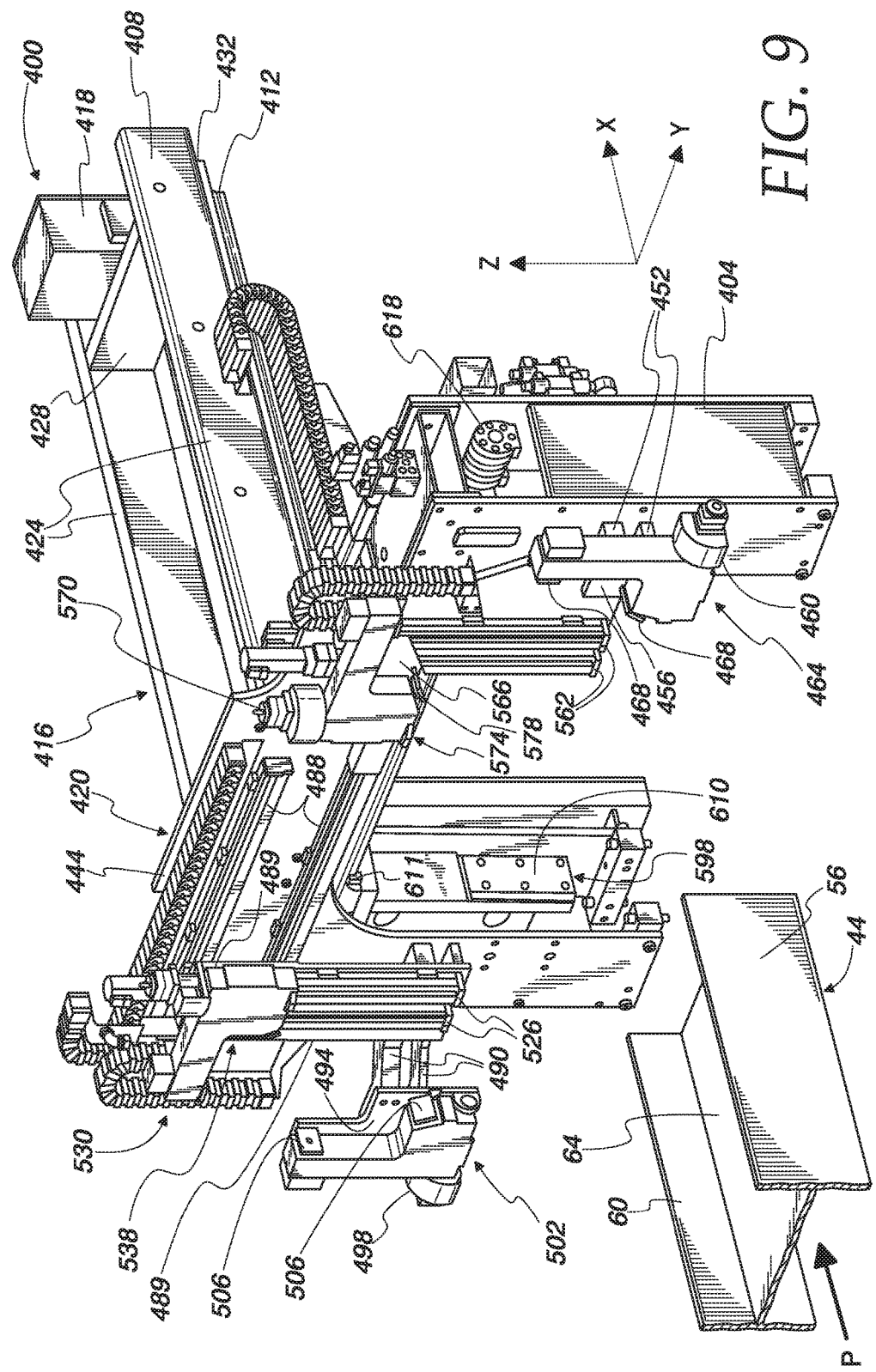
FIG. 9 is a partial, enlarged, perspective view of the scanning assembly of the system shown in FIG. 1.

Referring now to FIG. 9, the scanning carriage 408 has a rear portion 416 serving as a counterbalance and holding an electronic control unit 418. The scanning carriage 408 further has an operative, front portion 420 for performing a scan of the surface of the workpiece 44. The rear portion 416 includes a pair of spaced-apart box beams 424 connected by struts 428. The bottom of each of the box beams 424 is connected to a plate 432 fixedly connected to the movable portion of the linear rails 412. One of the plates 432 is provided with a rack (not visible) for being driven by a motorized pinion (not visible) that is mounted to the scanning gantry 404.

Figure 13:
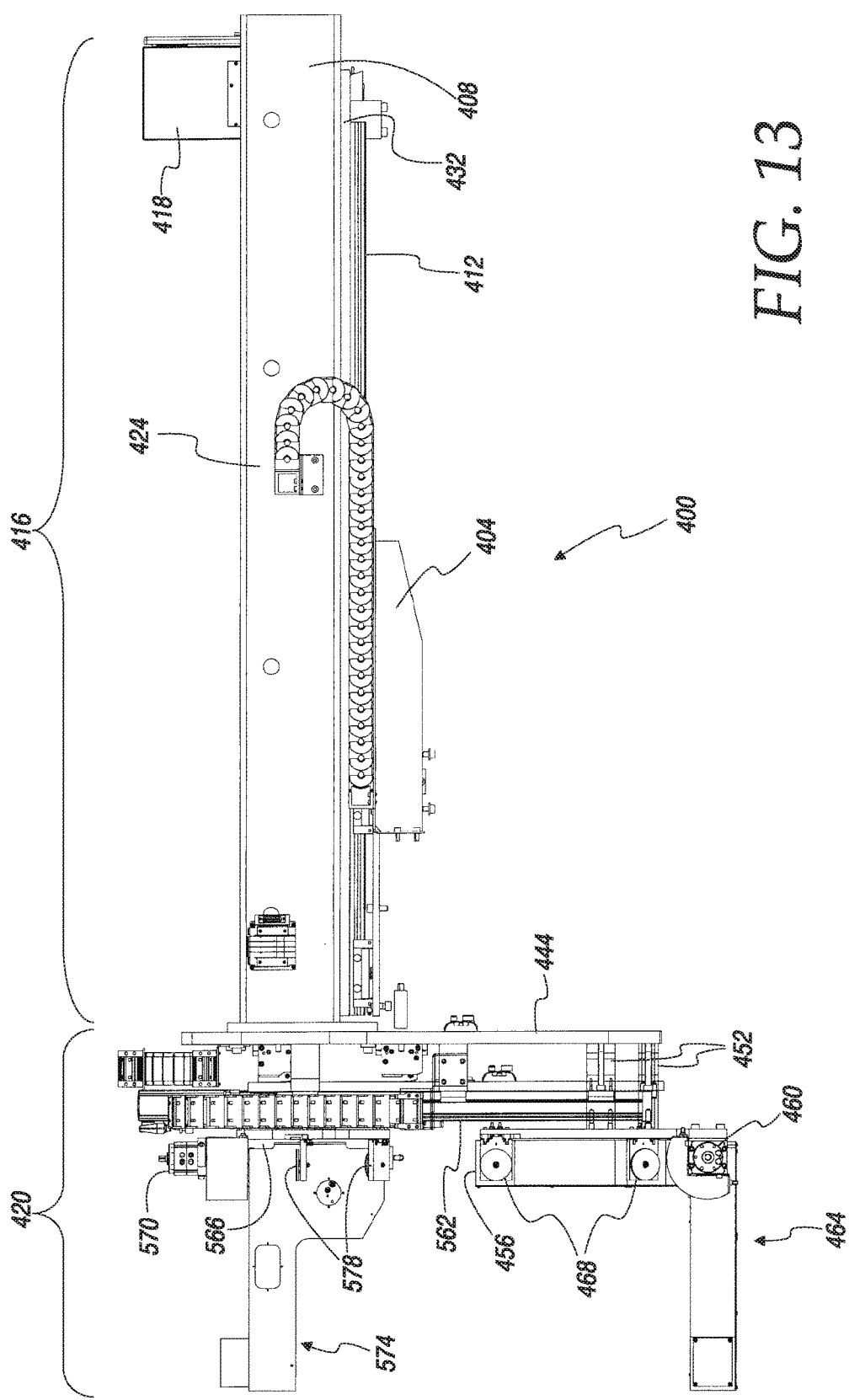
FIG. 13 is a partial, enlarged, side elevation view taken along the plane 13-13 in FIG. 12A showing only the scanning assembly components.
Figure 14:
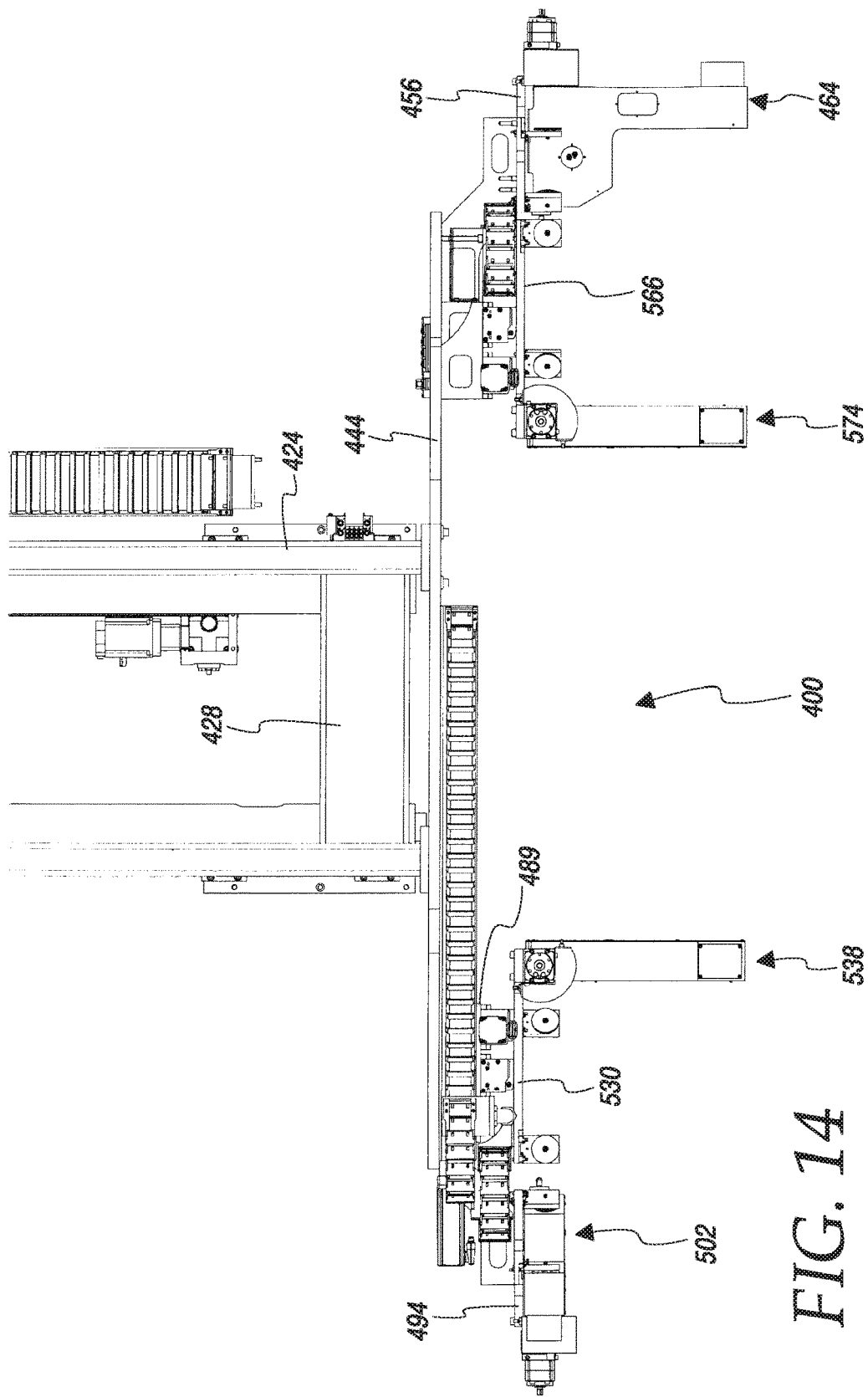
FIG. 14 is a partial, enlarged, top plan view of the scanning assembly components shown in FIG. 12A.
Figure 15:
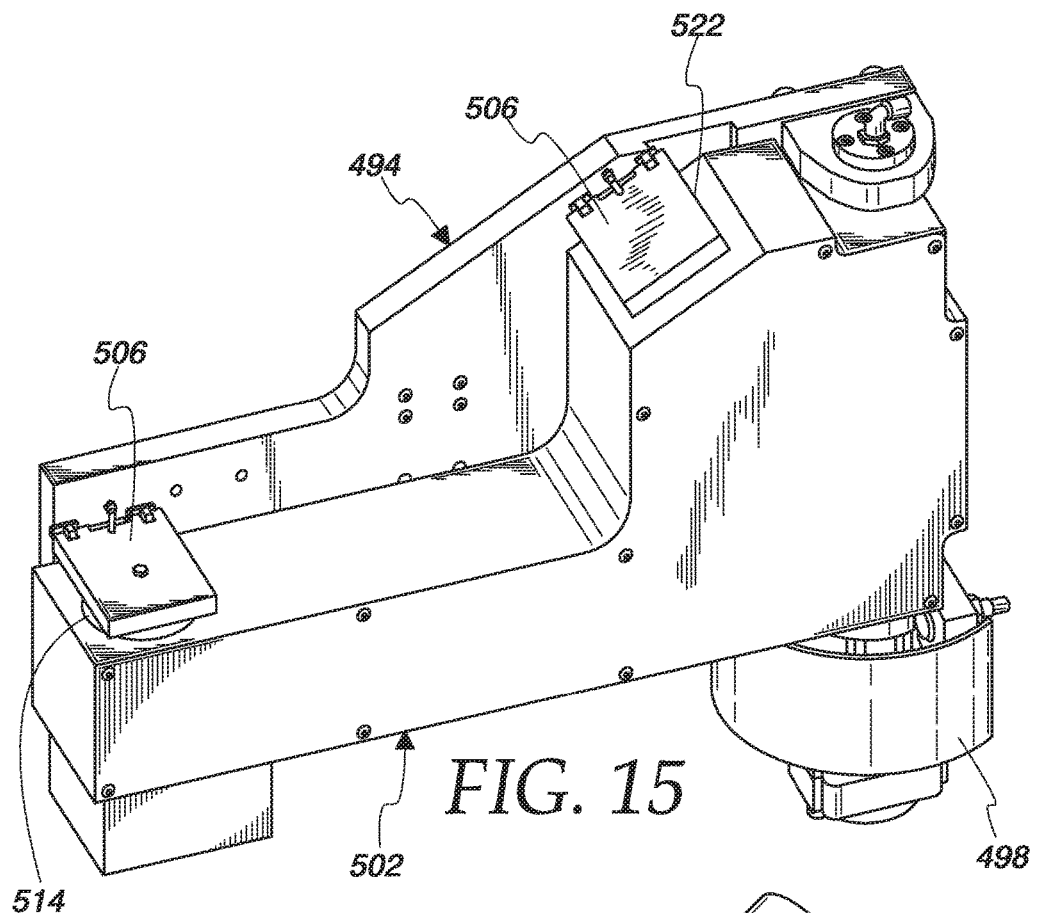
FIG. 15 is a partial, enlarged, perspective view of only the left side scanner unit and docking station of the scanning assembly of the system shown in FIG. 12A.
Figure 16:
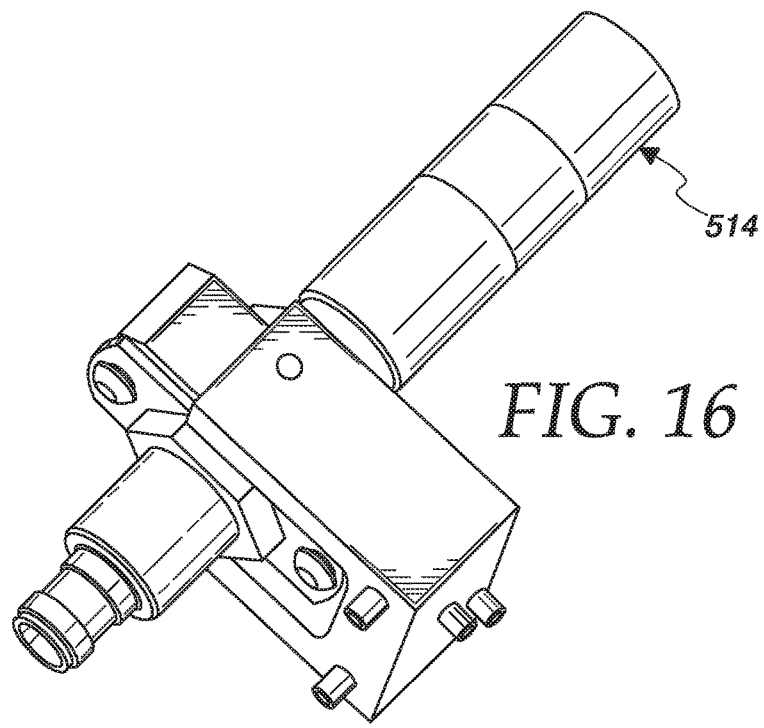
FIG. 16 is a partial, enlarged, perspective view of only the left side laser of the left side scanner unit shown in FIG. 15.

Referring now to FIG. 13, the front portion 420 of the scanning carriage 408 has a vertical back plate 444 fixedly connected to each of the box beams 424.

With reference to FIG. 9, the back plate 444 has a first, or right side from which a pair of arms 452 extends. The arms 452 terminate at a right side scanner docking station 456. The right side scanner docking station 456 supports an actuator or motor 460 for rotating a pivotable right side camera-laser unit ("CLU") or right side scanner unit 464. In the illustrated embodiment of the inventive system 40, the motor 460 is a pneumatic motor, but may be a servo motor, or any other suitable motor. The right side scanner docking station 456 further includes two aperture covers 468 (FIGS. 9 and 10) for covering or otherwise sealing a pair of apertures on the right side scanner unit 464 for purposes of protecting instrumentation therein from debris, elements, and wear, as will be discussed below.

Figure 10:
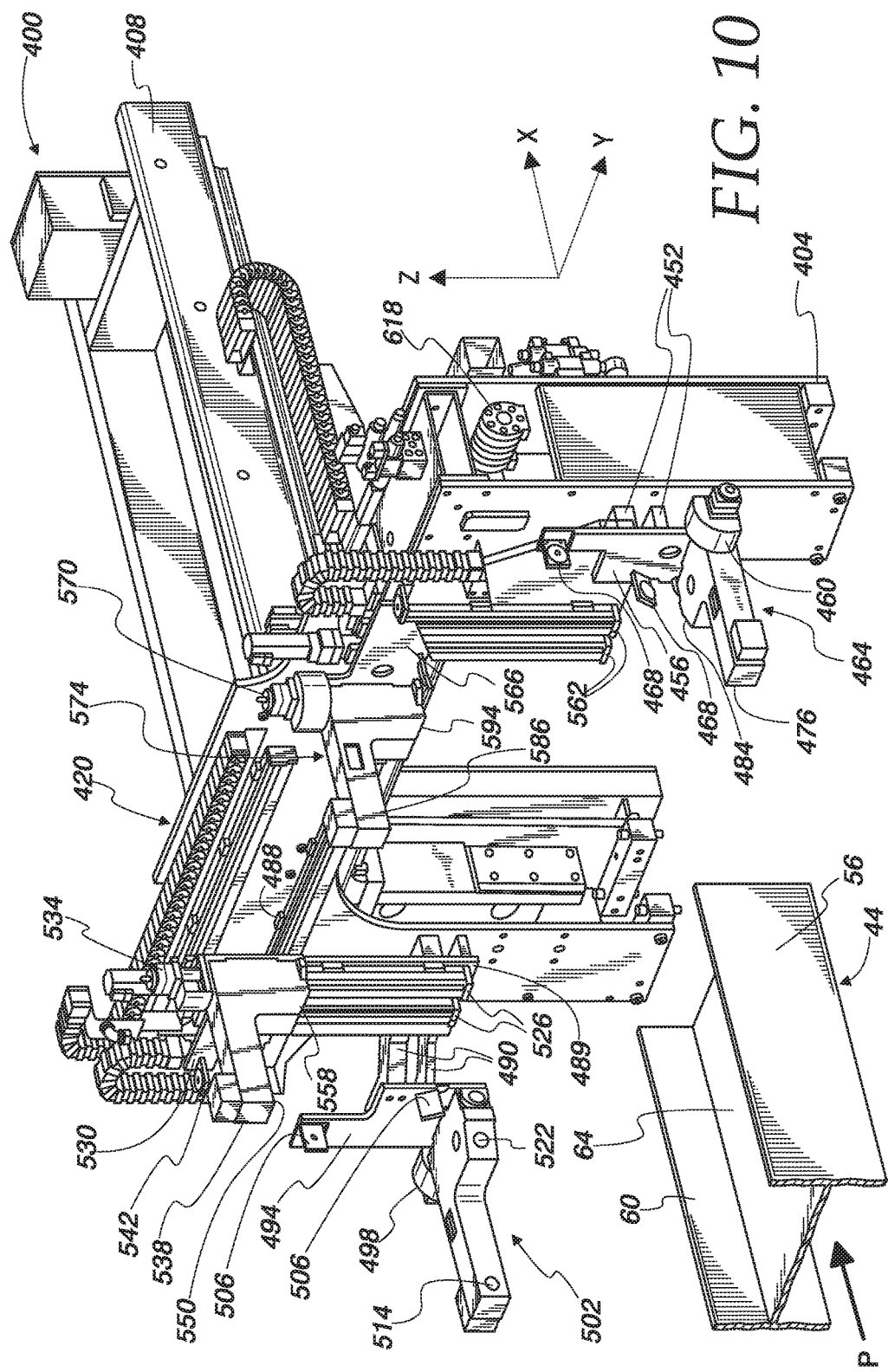
FIG. 10 is a partial, enlarged, perspective view of the scanning assembly of the system shown in FIG. 1.

Still referring to FIG. 9, the right side scanner unit 464 is configured to rotate about ninety degrees with respect to the right side scanner docking station 456 from a stored or storage configuration (FIG. 9) into a scanning or deployed configuration (FIG. 10) in order to scan a right side surface of a portion of a workpiece 44 (FIG. 1). The right side scanner unit 464 contains a right side laser 476 (FIG. 10). The right side laser 476 in the illustrated embodiment is of the conventional type that emits a beam of light having a planar, "sheet of light" or fan-shaped swath configuration which, when impinging upon a workpiece surface, defines a straight line on the surface as shown, for example, in FIG. 1 wherein the fan-shaped swath is designated 477 and the straight line is designated 479 in FIG. 11. In other words, the right side laser 476 is positioned to shine the light in a vertical swath 477 (along the z-axis, perpendicular to the scan, or x-axis) across a right side portion of the workpiece 44. The right side scanner unit 464 contains a right side camera 484. The right side camera 484 is positioned at a predetermined, known angle with respect to the right side laser 476 such that the three-dimensional location of the vertical line 479 on the right side of a workpiece 44 can be recorded by the right side camera 484, and stored in local memory for later transmission to a control system for processing in a control application.

Referring still to FIG. 9, the back plate 444 has a second, or left side along which two horizontally-extending linear rails 488 extend. The linear rails 488 support an intermediate plate 489 from which another pair of arms 490 extends. The arms 490 terminate at, and support, a left side scanner docking station 494. The left side scanner docking station 494 supports an actuator or motor 498 for rotating a pivotable left side CLU or left side scanner unit 502. In the illustrated embodiment of the inventive system 40, the motor 498 is a pneumatic motor, but may be a servo motor, or any other suitable motor or actuator. The left side scanner docking station 494 further has two aperture covers 506 (FIGS. 9 and 10) for covering or otherwise sealing a mating pair of apertures on the left side scanner unit 502 for purposes of protecting the instrumentation therein from debris, elements, and wear, as will be discussed below.

Figure 11:
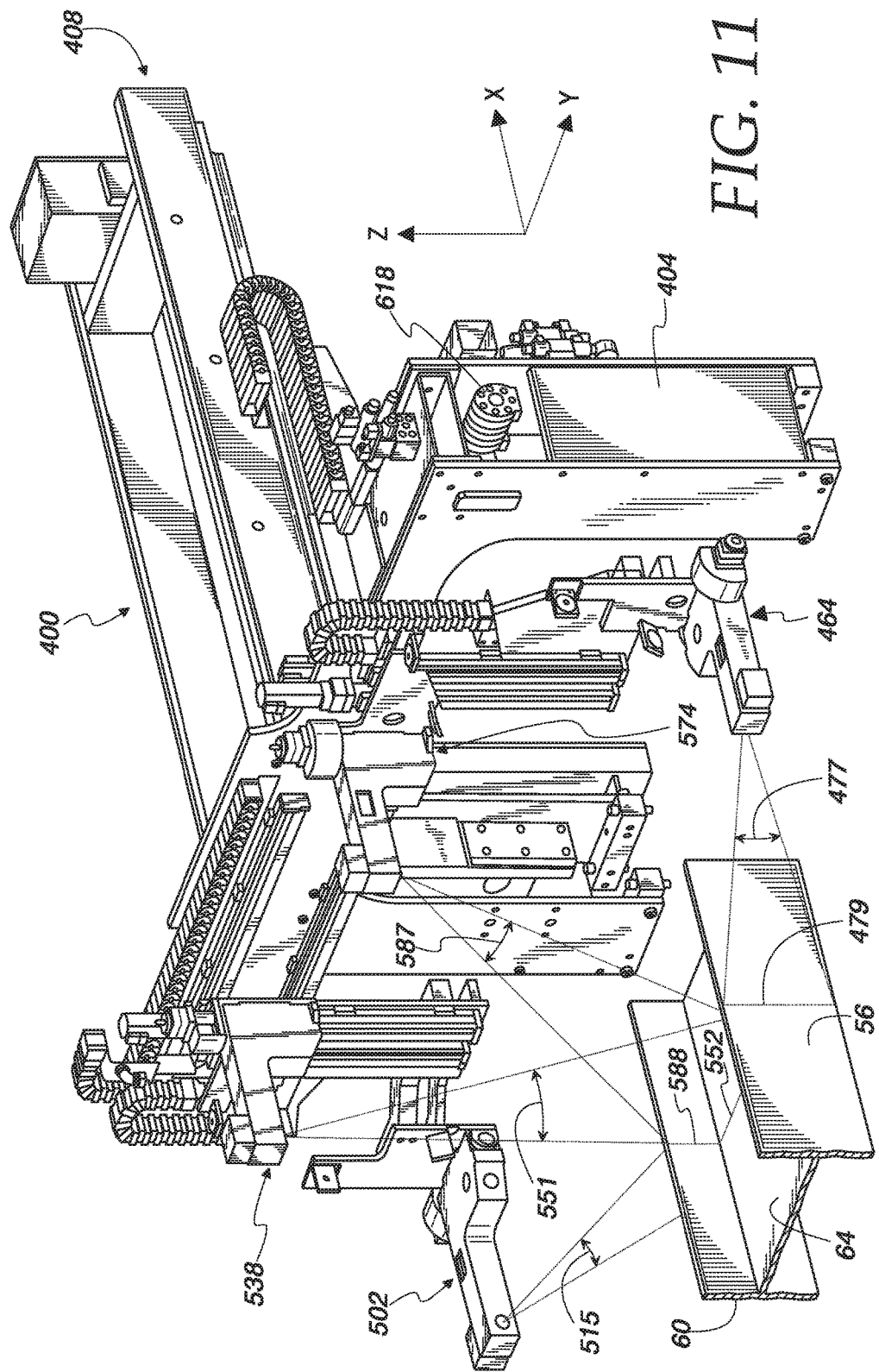
FIG. 11 is a partial, enlarged, perspective view of the scanning assembly of the system shown in FIG. 1.

Still referring to FIG. 9, the left side scanner unit 502 is also configured to rotate about ninety degrees with respect to the left side scanner docking station 494 from stored or storage configuration (FIG. 9) into a scanning or deployed configuration (FIG. 10) in order to scan a left side surface of a portion of a workpiece 44 (FIG. 11). The left side scanner unit 502 contains a left side laser 514 (FIG. 10). The left side laser 514 in the illustrated embodiment is of the conventional type that emits a beam of light having a planar, "sheet of light" or fan-shaped swath configuration which, when impinging upon a workpiece surface, defines a straight line on the surface as shown, for example, in FIG. 11 wherein the fan-shaped swath is designated 515 (the straight line on the left surface of the workpiece 44 is not visible in FIG. 11). In other words, the left side laser 514 is positioned to shine the light in a vertical swath 515 (along the z-axis, perpendicular to the scan, or x-axis) across a left side portion of the workpiece 44. The left side scanner unit 502 contains a right side camera 522. The left side camera 522 is positioned at a predetermined, known angle with respect to the right side laser 514 such that the three-dimensional location of the vertical line on the left side of a workpiece 44 can be recorded by the left side camera 522, and stored in local memory for later transmission to a control system for processing in a control application.

The linear rails 488 enable the left side scanner unit 502 be moved horizontally toward or away from the left side of a workpiece 44 depending on the size and shape of the particular workpiece 44 to be scanned.

Still referring to FIG. 9, the back plate 444 is further provided with a pair of vertically-extending linear rails 526 allowing vertical movement of a first top scanner docking station 530. The first top scanner docking station 530 supports a motor 534 for driving a pivotable first top CLU or first top scanner unit 538. The motor 534 is preferably a pneumatic motor, but may be a servo motor, or any other suitable motor or actuator. The first top scanner docking station 530 further has two aperture covers 542 (FIG. 10) for covering or otherwise sealing a pair of apertures on the first top scanner unit 538 for purposes of protecting the instrumentation therein from debris, elements, and wear, as will be discussed below.

Still referring to FIG. 9, the first top scanner unit 538 is also configured to rotate about ninety degrees about a vertical axis with respect to the first top scanner docking station 530 from stored or storage configuration (FIG. 9) into a scanning or deployed configuration (FIG. 10) in order to scan a top surface of a portion of a workpiece 44 (FIG. 11).

The first top scanner unit 538 contains a first top laser 550 (FIG. 10). The first top laser 550 in the illustrated embodiment is of the conventional type that emits a beam of light having a planar, "sheet of light" or fan-shaped swath configuration which, when impinging upon a workpiece surface, defines a straight line on the surface as shown, for example, in FIG. 11 wherein the fan-shaped swath is designated 551 and the straight line on the top surface of the workpiece 44 is designated as 552 in FIG. 11. In other words, the first top laser 550 is positioned to shine the light in a horizontal swath 551 (along the y-axis, perpendicular to the scan, or x-axis) across a top portion of the workpiece 44. The first top scanner unit 538 contains a first top camera 558. The first top camera 558 is positioned at a predetermined, known angle with respect to the first top laser 550 such that the three-dimensional location of the horizontal line 552 on the top side of a workpiece 44 can be recorded by the first top camera 558, and stored in local memory for later transmission to a control system for processing in a control application.

The linear rails 488 on the back plate 444, in conjunction with the linear rails 526 connecting the first top scanner docking station 530, enable the first top scanner unit 538 to move both horizontally and vertically toward or away from a workpiece 44 depending on the size and shape of the particular workpiece 44 to be scanned.

With reference to FIG. 9, the back plate 444 is further provided with a pair of linear rails 562 allowing vertical movement of a second top scanner docking station 566. The second top scanner docking station 566 supports a motor 570 for driving a pivotable second top CLU or second top scanner unit 574. The motor 570 is preferably a pneumatic motor, but may be a servo motor, or any other suitable motor or actuator. The second top scanner docking station 566 further has two aperture covers 578 (FIG. 9) for covering or otherwise sealing a mating pair of apertures on the second top scanner unit 574 for purposes of protecting the instrumentation therein from debris, elements, and wear, as will be discussed below.

Still referring to FIG. 9, the second top scanner unit 574 is also configured to rotate about ninety degrees about a vertical axis with respect to the second top scanner docking station 566 from a stored or storage configuration (FIG. 9) into a scanning or deployed configuration (FIG. 10) in order to scan a top surface of a portion of a workpiece 44 (FIG. 11). The second top scanner unit 574 contains a second top laser 586 (FIG. 10). The second top laser 586 in the illustrated embodiment is of the conventional type that emits a beam of light having a planar, "sheet of light" or fan-shaped swath configuration which, when impinging upon a workpiece surface, defines a straight line on the surface as shown, for example, in FIG. 11 wherein the fan-shaped swath is designated 587 and the straight line on the top surface of the workpiece 44 is designated as 588 in FIG. 11. In other words, the second top laser 586 is positioned to shine the light in a horizontal swath 587 (along the y-axis, perpendicular to the scan, or x-axis) across a top portion of the workpiece 44. The second top scanner unit 574 contains a second top camera 594 (FIG. 10). The second top camera 594 is positioned at a predetermined, known angle with respect to the second top laser 586 such that the three-dimensional location of the horizontal line 588 on the top side of a workpiece 44 can be recorded by the second top camera 594, and stored in local memory for later transmission to a control system for processing in a control application.

The linear rails 562, connecting the back plate 444 and the top scanner docking station 566, enable the second top scanner unit 574 to move vertically toward or away from a workpiece 44 depending on the size and shape of the particular workpiece 44 to be scanned.

In the particular illustrated embodiment of the inventive system, all of the lasers used in the scanning assembly 400 are ZM18S3-F-660-LP60, 660 nanometer wavelength red laser line generators with a substantially flat or planar 60 degree spread or fan configuration manufactured by Z-Laser having facilities at 15-101 Boul. Don Quichotte, Suite 355, Ile Perrot, QC J7V 7X4, Canada. Furthermore, in the particular illustrated embodiment of the inventive system, all of the cameras used in the scanning assembly 400 are preferably Ranger E50 cameras manufactured by SICK having facilities at Erwin-Sick-Str. 1, 79183 Waldkirch, Germany, and each are fitted with a 12.5 mm lens manufactured by Edmund Optics having facilities at 101 Fast Gloucester Pike, Barrington, N.J. 08007, USA. Other types or brands or models of lasers, lenses, and cameras may be utilized depending on the scanning speed desired, scan density, the processing environment, the particular workpieces to be processed, workpiece surface conditions, etc. The inventors have found that it may be particularly advantageous to change the color and/or the wavelength of the particular laser being used based on the surface condition of the workpiece 44 (e.g., condensed water on the surface of the workpiece, color of the workpiece, reflectivity of the workpiece, or scale/rust/dirt/coatings on the workpiece surface).

It will be understood that the scanning assembly 400 may have other forms, and need not be limited to movement along only a single scan axis and need not be attached to a gantry for some applications. For example, the scanning assembly could be positioned on another multi-axis industrial robot or a rotational track located around the processing path "P". The scanning assembly 400 could be positioned adjacent the processing path "P" (e.g., on the left side, right side, beneath, etc.). Furthermore, the scanning assembly 400 could be provided as part of the inlet conveyor 48 or gantry 88, or as a separate free-standing structure, and need not be attached to, or located over, the outlet conveyor 300.

It will also be understood from this disclosure that the number, location, and configuration of scanner units may be changed depending on various factors such as the desired speed of the scan, the desired density of the scan, the shape of the workpiece, and the space available for the system 40.

Figure 7:
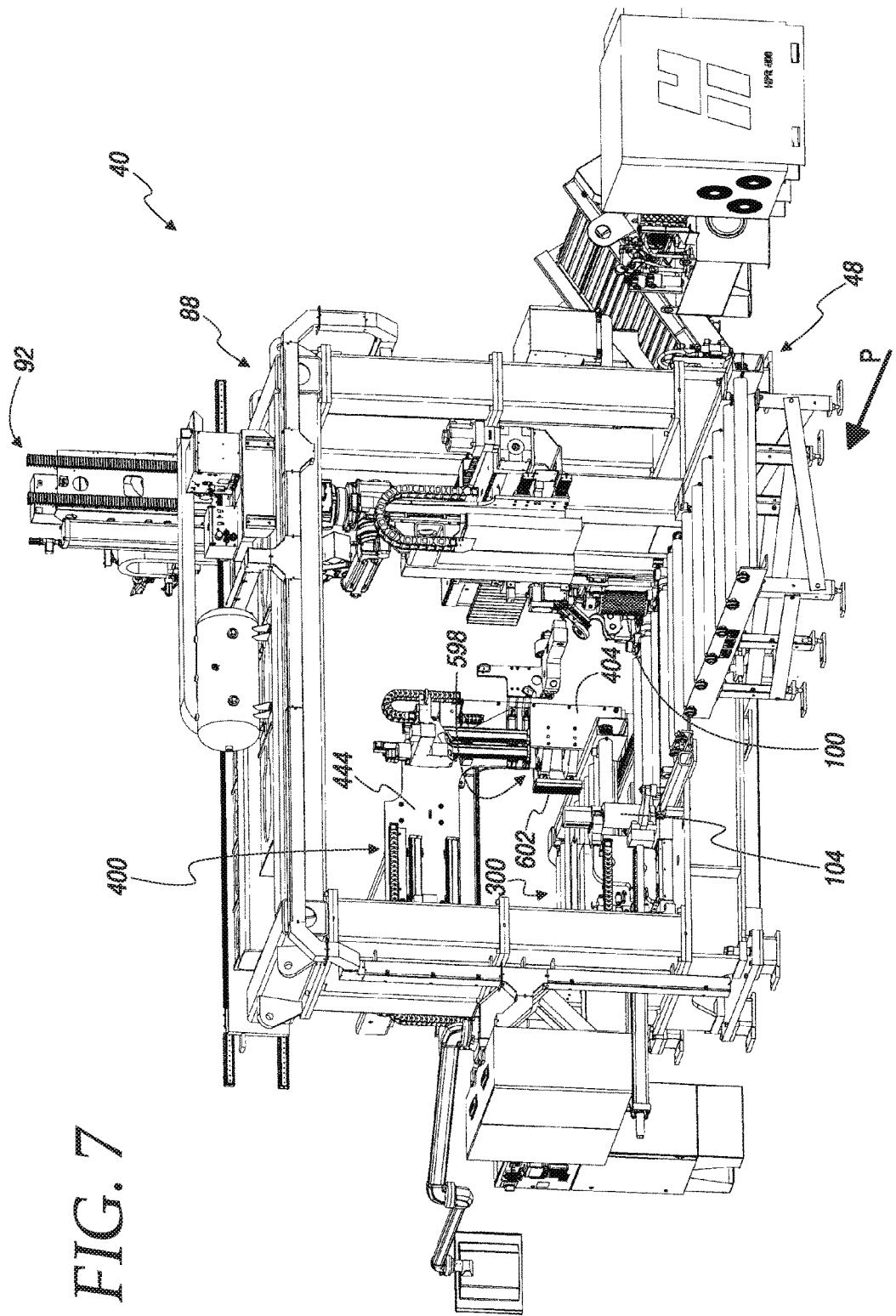
FIG. 7 is a perspective view, taken from the front, of the system shown in FIG. 1, however in FIG. 7 the workpiece is not shown.

With reference to FIGS. 7 and 9, it can be seen that the scanning gantry 404 is provided with a secondary or exit datum clamp assembly 598 for clamping a portion of a workpiece 44 within the scanning gantry 404. The exit datum clamp assembly 598 includes a right side or datum clamp member 602 (FIG. 7 only) that is horizontally adjustable in a direction generally perpendicular to the processing path "P" by a pair of pneumatic linear actuators (not visible). The exit datum clamp assembly 598 further includes a left side clamp member 610 (FIG. 9 only) that is connected to the underside of the scanning gantry 404 by a pair of linear rails, and is horizontally movable, toward or away from the right side clamp member 602. The left side clamp member 610 is driven along the linear rails 611 (FIG. 9 only) by a hydraulic screw assembly 618 (FIG. 9 only). The exit datum clamp assembly 598 may be utilized at any time to clamp a portion of a workpiece 44 that is beneath the scanning gantry 404, and is particularly useful for clamping a workpiece 44 when performing a processing operation on a rear portion of the workpiece 44, as will be discussed in detail hereinafter.

The architecture and layout of the control system or application for the scanning assembly 400 is shown diagrammatically in the Appendix. The four aforementioned scanner units 464, 502, 538, and 574 are electrically connected and controlled by an electronic control system. The electronic control system controls the data acquisition sequence of the individual scanner units 464, 502, 538, and 574 based on x-axis location information of the scanning carriage 408 provided by an encoder (not visible). The encoder determines the position of the scanning carriage 408 along the linear rails 412 with respect to the on the scanning gantry 404. Each of the individual scanner units 464, 502, 538, and 574 and the electronic control system 622 are electrically connected to a vision processing or control application running on a computer or control terminal 630 (FIG. 1). The three-dimensional surface data, or Cartesian points, of the workpiece 44 are acquired by each of the individual scanner units 464, 502, 538, and 574, and are subsequently stitched together into a comprehensive point cloud by the control application running on the control terminal 630.

The control application preferably is, or includes, a single software program that controls all operational aspects of the system 40 (e.g., the PLC (i.e., "programmable logic controller") system, the scanning assembly 400, the industrial robot 208, and/or the gas mixture system discussed below). However, it will be understood that the that the control application may be split into any number of programs or applications running on the control terminal 630 or any other computer. For example, the scanning assembly 400 may be controlled by a vision application, while the industrial robot 208 may be controlled by robotics control software, and such applications may communicate or otherwise share data for purposes of processing the workpiece 44. One exemplary form of the control application is described in the Appendix.

The application or algorithm for controlling the data acquisition and data processing may be performed by any general or special computer, which will be readily apparent to one of ordinary skill in the art, and the details of which form no part of the present invention. It will be appreciated that the scanning assembly 400 may have other forms and may operate differently than the exemplary structures shown in the attached Appendix.

Figure 17:
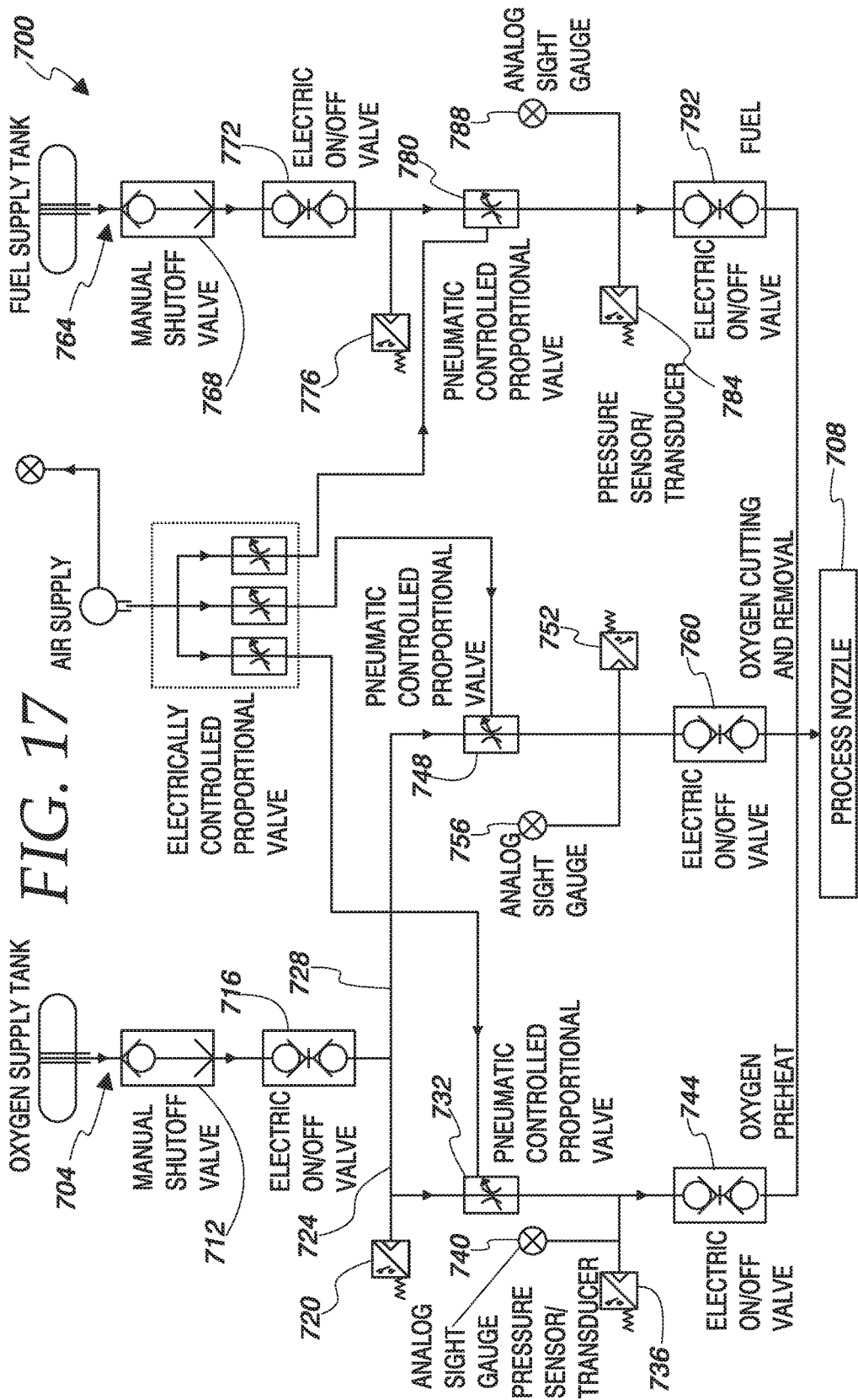
FIG. 17 is a diagrammatic view of a gas mixture system according to another aspect of the present invention.
Figure 18:
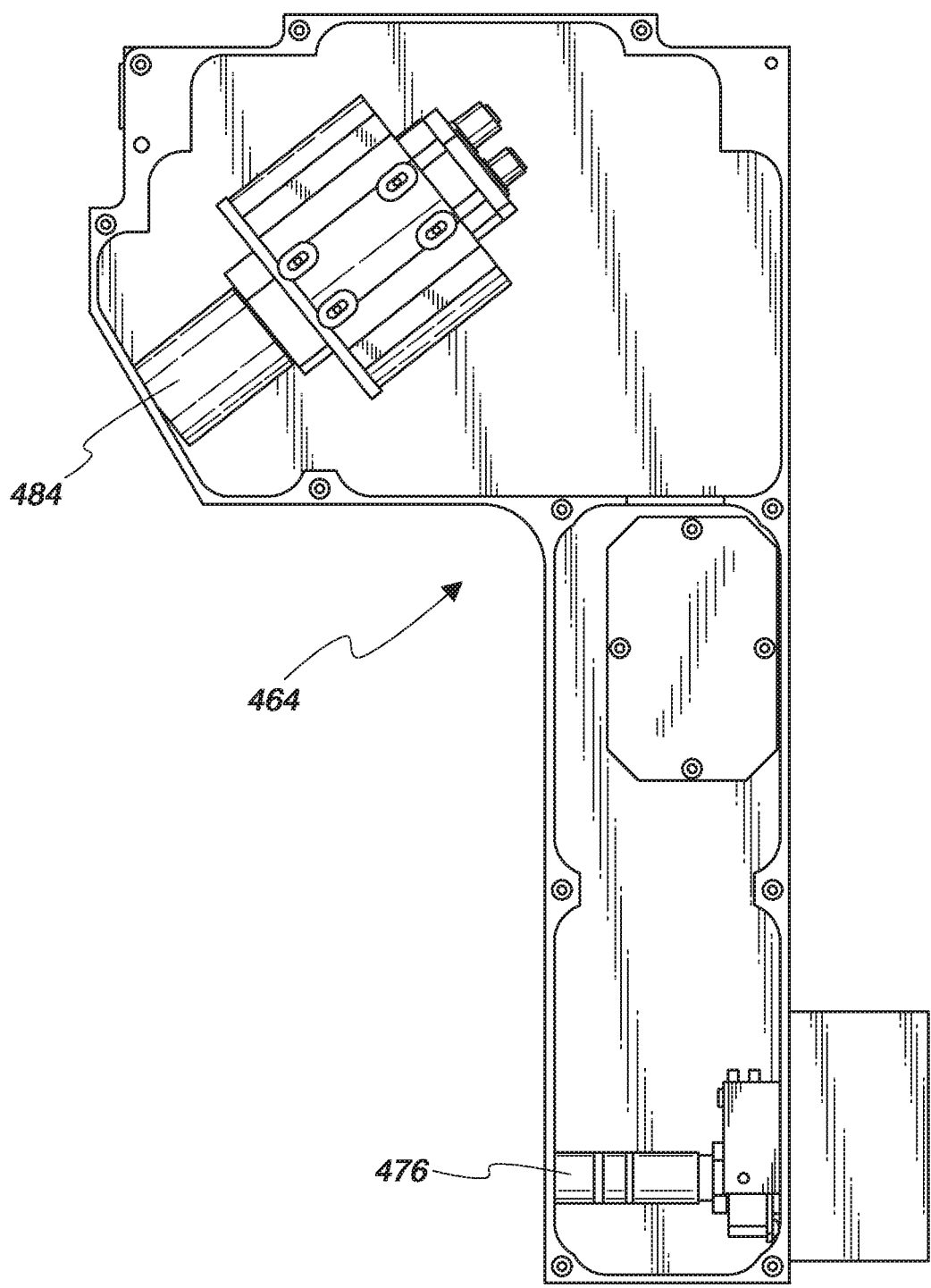
FIG. 18 is an enlarged view of the right side scanner unit shown in FIG. 12A, but in FIG. 18 an exterior wall portion of the unit has been removed to show interior components.
Figure 19:
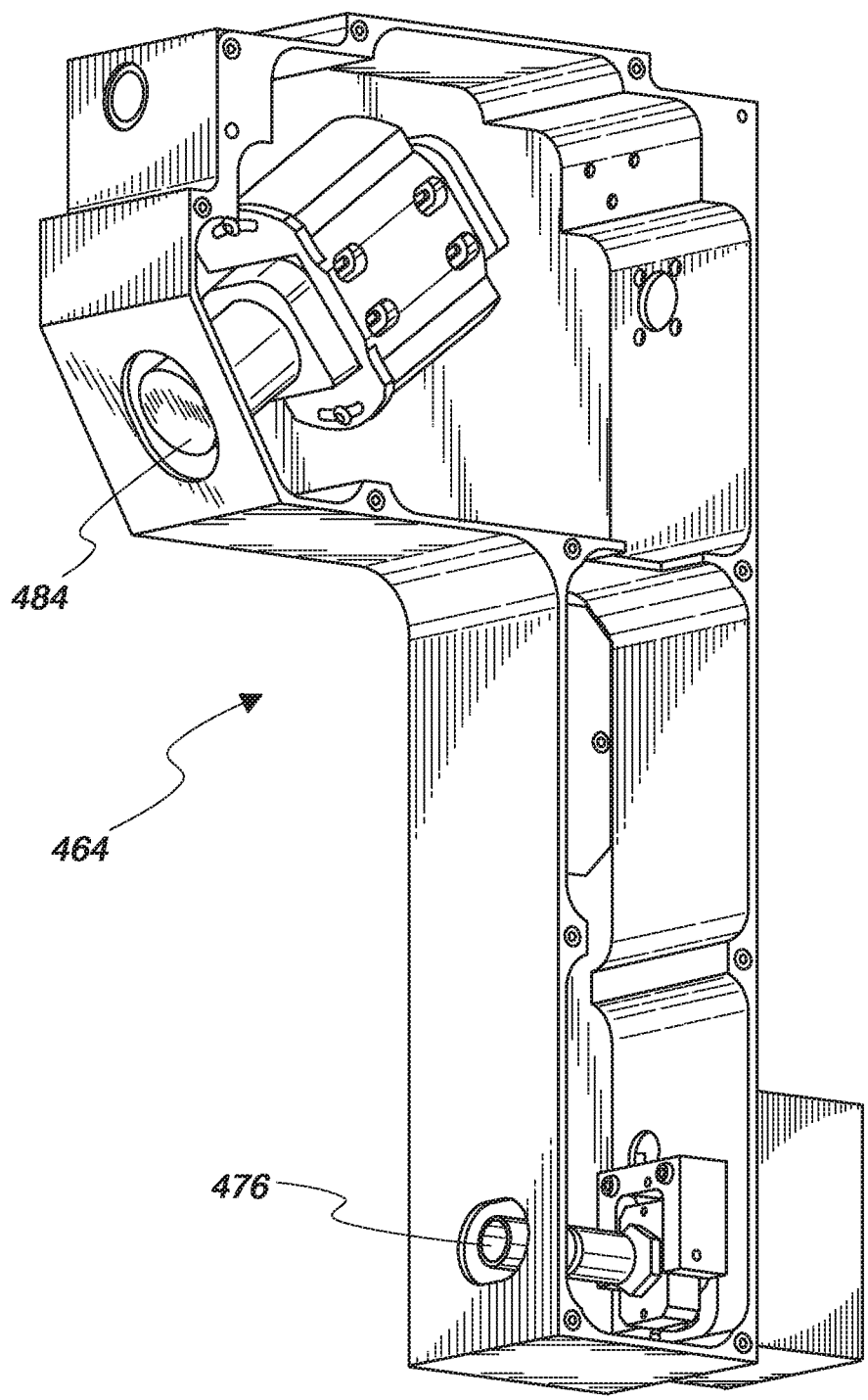
FIG. 19 is a perspective view of the scanner unit shown in FIG. 18.

The inventors have found that providing the system 40 with an intelligent gas mixture system 700 (FIG. 17), described in detail below, can be advantageously utilized to address a number of common problems with controlling gases used in prior processing systems. The location of the various pressure sensors enables the control software or application running on the control terminal 630 to determine if there is an abnormal condition within the gas mixture system—from the gas supply sources to the process nozzle 708 (FIG. 17 only). During the processing of the workpiece 44 with a gas torch, the pressures within the gas mixture system 700 are monitored and recorded in memory by the application. Historical pressure data is used by the control application to track pressure trends to predict abnormal conditions. By (1) accounting for known transient pressure impulses caused by motion of the process nozzle 708 near a surface of the workpiece 44, and (2) comparison of normal operating gas pressure with historical data, the application can determine: (i) clogging of the process nozzle 708 (due to gradual pressure increases over time); (ii) wear of the process nozzle 708 (due to gradual pressure decreases over time); (iii) line breaks (due to sharp pressure decreases); and (iv) line blockages (due to sharp pressure increases).

Figure 12:
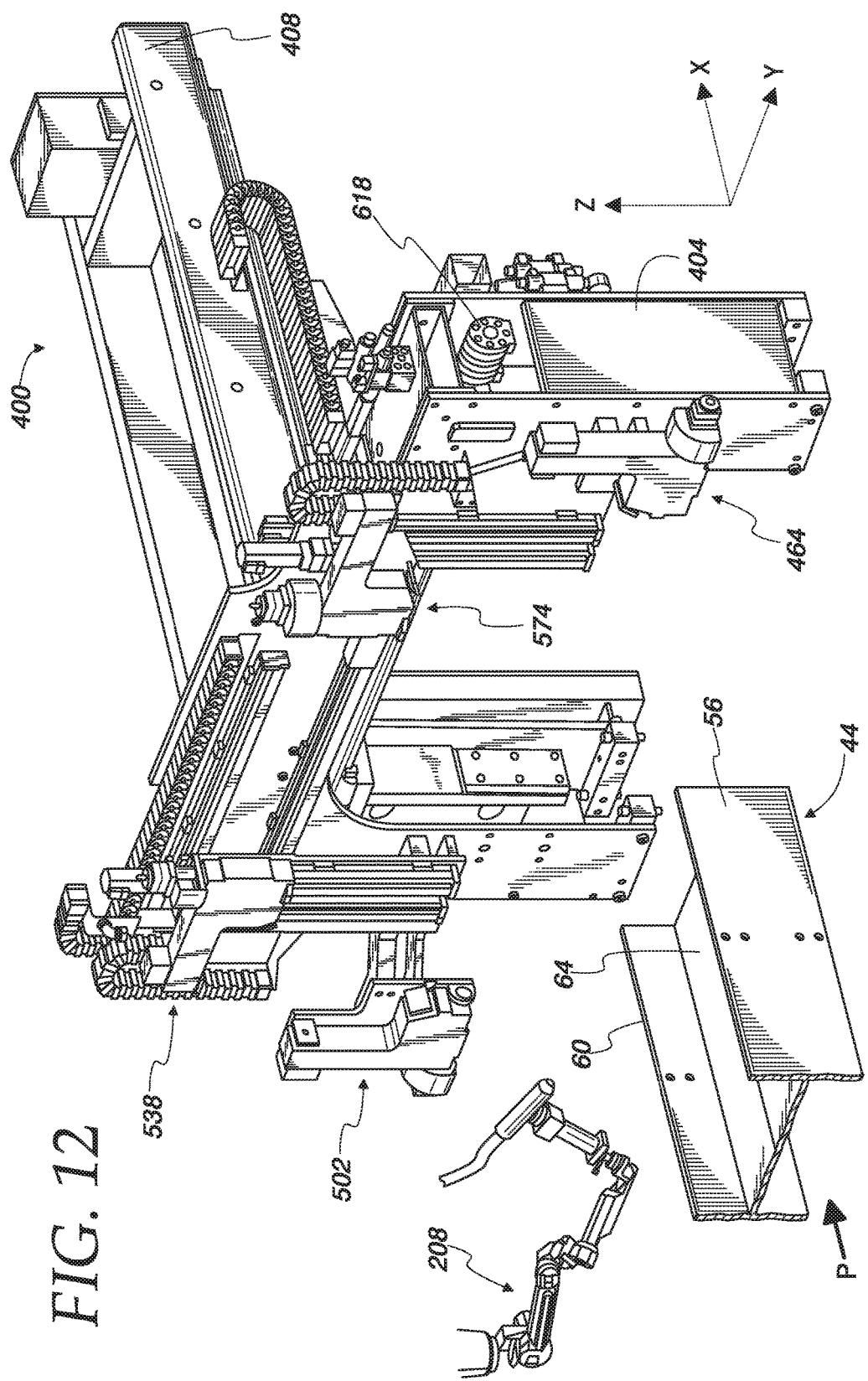
FIG. 12 is a partial, enlarged, perspective view of the scanning assembly of the system shown in FIG. 1.
Figure 12A:
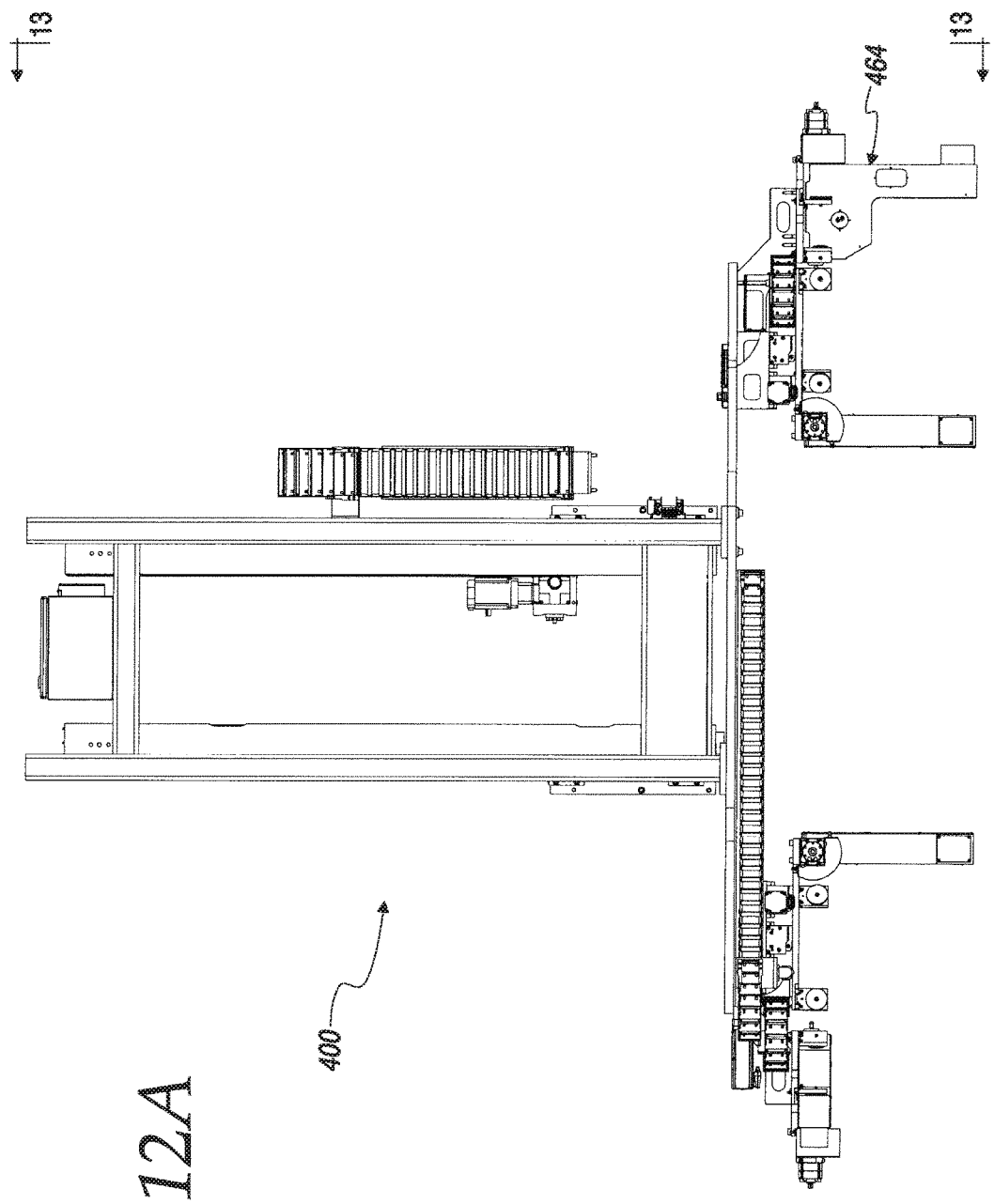
FIG. 12A is a partial, top plan view of only the scanning assembly of the system shown in FIG. 1.

The gas mixture system 700 shown diagrammatically in FIG. 17 may provide complete automation of the gas mixing for the processing tool, which in the illustrated preferred embodiment of the system 40 (FIG. 1) is fort the oxygen acetylene torch 192 (FIG. 6), however it will be understood that other gasses and torch types may be utilized with the gas mixture system 700. The gas mixture system 700 further offers the ability to detect gas line leakage, torch nozzle wear, blockage, and clogging. The gas mixture system 700 also provides the ability to decrease the waste of gases used in the processing of a workpiece 44 (FIG. 12) by recording and analyzing the Cartesian positional information of the particular processing tool when attached to the industrial robot 208 (FIG. 12).

Still referring to FIG. 17, the gas mixture system 700 is controlled and monitored by a control software or application running on the control terminal 630 (FIG. 1) for the processing system 40. The gas mixture system 700 includes an oxygen subsystem 704 for controlling the flow of oxygen gas to a process nozzle 708 of a given processing tool (e.g., oxygen acetylene torch 192, etc.). The oxygen subsystem 704 includes a manual oxygen supply line shutoff valve 712 that is located downstream of an oxygen supply source, the latter of which forms no part of the present invention. The manual oxygen supply line shutoff valve 712 is utilized for maintenance of the oxygen subsystem 704 and during replacement of the oxygen supply source. An electrically actuated on/off valve 716 is located downstream of the manual oxygen supply line shutoff valve 712, and is controlled by the application to control the flow of oxygen during normal operation of the gas mixture system 700. A first pressure transducer or pressure sensor 720 is located in the oxygen subsystem 704, downstream of the electrically actuated on/off valve 716, and provides a first location of pressure data to the application. Downstream of the first pressure sensor 720, the oxygen subsystem 704 splits into two lines: an oxygen preheating line 724 and a material removal line 728.

Downstream of the first pressure sensor 720, the oxygen preheating line 724 has a pneumatically-operated proportional control valve 732 that is controlled by the application. Downstream of the proportional control valve 732 is a second pressure sensor 736 and analog pressure sight gauge 740. The second pressure sensor 736 provides pressure information to the application for purposes of feedback control for the proportional control valve 732. Downstream of the second pressure sensor 736 is another electrically actuated on/off valve 744 that, when actuated, opens to allow the preheat (i.e., preheated) oxygen to flow to process nozzle 708.

With regard to the material removal line 728, downstream of the first pressure sensor 720 the material removal line 728 has a pneumatically-operated proportional control valve 748 that is controlled by the application. Downstream of the proportional control valve 748 is a pressure sensor 752 and analog pressure sight gauge 756. The pressure sensor 752 provides pressure information to the application for purposes of feedback control of the proportional control valve 748. Downstream of the pressure sensor 752 is an electrically actuated on/off valve 760 that, when actuated, allows the material removal oxygen to flow to the process nozzle 708.

Still referring to FIG. 17, the gas mixture system 700 further includes a fuel subsystem 764 for controlling the flow of fuel gas (e.g., acetylene, propane, methylacetylene-propadiene propane, propylene, natural gas, compressed air, nitrogen, etc.) to the process nozzle 708 of a given processing tool. The fuel subsystem 764 includes a manual fuel supply line shutoff valve 768 that is located downstream of a fuel supply source, the latter of which forms no part of this aspect of the invention. The manual fuel supply line shutoff valve 768 is utilized for maintenance of the fuel subsystem 764 and during replacement of the fuel supply source. A first electrically actuated on/off valve 772 is located downstream of the manual fuel supply line shutoff valve 768, and is controlled by the application to control the flow of the fuel. A first pressure transducer or pressure sensor 776 is located in the fuel subsystem 764 downstream of the first electrically actuated on/off valve 772 and provides pressure data to the application. Following the first pressure sensor 776, the fuel subsystem 764 has a pneumatically-operated proportional control valve 780 that is controlled by the application. Downstream of the proportional control valve 780 is a second pressure sensor 784 and analog pressure sight gauge 788. The second pressure sensor 784 provides pressure information to the application for purposes of feedback control of the proportional control valve 780. Downstream of the second pressure sensor 784 is another electrically actuated on/off valve 792 that, when actuated, allows the fuel gas to flow to the process nozzle 708.

It will be understood that the intelligent gas mixture system 700 herein need not be limited to only a pair of subsystems (e.g., oxygen and fuel) and may be used with any number of subsystems for any number of gases or fuels, depending on the particular processing or processing tool required by a user of the system 40. Furthermore, the gas mixture system 700 may include fewer or more sensors and valves to provide different feedback and control, depending on the nature of the application.

The inventors have further found that the intelligent gas mixture system 700 described herein can further be advantageously utilized to improve the quality and efficiency of the process (e.g., material removal) and improve the management of the gases used by the processing tool processing system. The control software or application running on the control terminal 630 receives and records the three dimensional Cartesian coordinates of the process nozzle 708 or a particular processing tool that is attached to the industrial robot 208 from the PLC at the beginning and the end of the particular process. Historical location data of the process nozzle 708 can then be utilized to minimize, or at least reduce, the usage of process gases (e.g., during oxygen preheating), and further can be utilized to minimize, or at least reduce, the time required to complete a particular process (e.g., reduction of process cycle time).

According to one way of initially operating the system 40, an operator of the system 40 will use the software application running on the control terminal control terminal 630 to start a processing job. The parameters of the processing job can be determined in the application by the operator, or more preferably, can be created in the application by loading an existing CAD/CAM file (or any other virtual representation of the workpiece 44 and the features to be cut or marked into the workpiece 44) for the particular workpiece 44 to be processed. When the CAD/CAM file is loaded, a graphical representation of the workpiece 44 is displayed by the application. The PLC application is then provided with the basic information of the workpiece 44, such as shape (e.g., H-beam. I-beam, L-beam, channel, etc.), size, thickness, length, etc. The PLC application uses this information to prepare the system for the particular workpiece 44. Specifically, the PLC application moves the individual scanner units 502, 538, and 574 to the ideal y-axis and z-axis locations by moving the individual scanner units 502, 538, and 574 along the linear rails 488, 526, and 562. Furthermore, the PLC application controls the loading position and hydraulic pressure for the clamp assembly 96. Hydraulic pressures are determined based on the workpiece 44 material thickness and shape.

The application automatically assigns a particular processing tool (e.g. an oxygen acetylene torch 192, a plasma cutting torch 196, a plasma marking torch 200, etc.) for creating each of the various features (e.g., bolt holes, layout marking, cut profiles) in the CAD/CAM file. The application next builds a process tree for each sequential process (e.g., cutting, coping, marking, etc.) to be performed on the workpiece 44 to create these features. The operator may manually adjust, in the application, the particular processing tool to be used and/or disable one or more processes from being performed. The operator may also manually adjust, in the application, the scan density of the scanning assembly 400 and the y-axis and z-axis locations of the individual scanner units 502, 538, and 574.

With reference to FIG. 1, in the following discussion it will be assumed that the workpiece 44 has the form of an I-beam having a first or right side flange 56, a second or left side flange 60, and a central web 64 connecting the right and left side flanges 56 and 60, respectively. The workpiece 44 can be positioned on the inlet conveyor 48 support surface rollers 84, such as by employing a mating conveyor, forklift, crane, or other machine (not illustrated), such that the right side flange 56 is generally located on the right side of the inlet conveyor 48 and the left side flange 60 is generally located on the left side of the inlet conveyor 48.

After the operator is finished preparing the process job in the application, and after the workpiece 44 has been positioned on the inlet conveyor 48, the processing job is started by initializing the PLC system when the operator presses a physical start button. The inlet conveyor rollers 84 are rotated to move the workpiece 44 forward so that the leading or front end of the workpiece 44 extends forwardly under the gantry 88. The direction of movement of the workpiece 44 along the processing path "P" of the inlet conveyor 48 toward the gantry 88 defines a "right side" and a "left side" as will be used herein.

The front end of the workpiece 44 is conveyed forward on the inlet conveyor 48 until the workpiece 44 is positioned between a first of the laser sensors 112 and associated reflectors 116, blocking the laser light of the sensor 112. Once the workpiece 44 has blocked the path of the first laser sensor 112, the workpiece 44 is driven further forwardly by the PLC system a predetermined distance based on the size, shape, and length of the workpiece 44, and then the workpiece 44 is clamped by the clamp assembly 96. Specifically, the second clamping surface 104 is hydraulically driven against the left side flange 60 forcing the right side flange 56 against the datum or first clamping surface 100. With the right side flange 56 located against the datum line defined by the first clamping surface 100, the encoder wheel 124 makes rolling contact with the right side flange 56. With the encoder wheel 124 in contact with the workpiece 44, the workpiece 44 is moved further forwardly by the clamp assembly 96 until a sufficient leading length of the workpiece 44 is extended or cantilevered into the processing volume between the inlet conveyor 48 and the exit conveyor 300 to accommodate the desired (i.e., programmed) processing (i.e., cutting, marking, drilling, etc.) at a first location of a feature (e.g., bolt hole, profile, layout marking) rearwardly from the leading end of the workpiece 44.

With reference now to FIGS. 9-11, when a front end portion of the workpiece 44 is located within the processing volume, the PLC application moves the individual scanner units 464, 502, 538, and 574 from the storage configuration to the deployed configuration. Specifically, the pneumatic motor 460 rotates the right side scanner unit 464 about ninety degrees with respect to the right side scanner docking station 456 such that the right side laser 476 is positioned to shine a vertical swath of light (in the z-axis, perpendicular to the scan, or x-axis) across the flange 56 on the right side portion of a workpiece 44 (e.g., see light line 479 in FIG. 11). Likewise, the pneumatic motor 498 (FIG. 10) rotates the left side scanner unit 502 about ninety degrees with respect to the left side scanner docking station 494 such that the left side laser 514 is positioned to shine a vertical swath of light (in the z-axis, perpendicular to the scan, or x-axis) across the flange 60 on the left side portion of a workpiece 44 (FIG. 11). Furthermore, the pneumatic motor 534 (FIG. 10) rotates the first top scanner unit 538 about ninety degrees with respect to the first top scanner docking station 530 such that the first top laser 550 is positioned to shine a horizontal swath of light (in the y-axis, perpendicular to the scan, or x-axis) across a top portion of a workpiece 44 (e.g., light line 552 on the web 64 in FIG. 11). Similarly, the pneumatic motor 570 (FIG. 10) rotates the second top scanner unit 574 about ninety degrees with respect to the second top scanner docking station 566 such that the second top laser 586 is positioned to shine a horizontal swath of light (in the y-axis, perpendicular to the scan, or x-axis) across a top portion of a workpiece 44 (e.g., light line 588 in FIG. 11).

Referring to FIG. 11, the PLC then moves the scanning carriage 408 along the x-axis on the linear rails 412 away from the scanning gantry 404 and toward the front end of the workpiece 44. As the scanning carriage 408 moves over the front end of the workpiece 44, each of the four swaths of light strike and move in the x-direction along what can be characterized as a "process window" over the surface of the workpiece 44. Likewise, each associated camera 484, 522, 558, 594 associated with each laser 476, 514, 550, 586 records the three-dimensional location of the respective swath of light moving along on the target regions of the workpiece 44. In this manner, the scanning assembly 400 is able to scan the workpiece surface locations (on the right, left, top sides) by acquiring workpiece 44 surface location slices or sections in the yz-plane as the scanning carriage 408 moves along the x-axis.

The inventors have found that it is particularly advantageous to sequence each laser and camera pair so as to minimize potential interference due to the intersection of laser light and further to minimize a particular camera recording the location of light from an unassociated laser (e.g., first top camera 558 erroneously recording the location of the laser light of the second top laser 586).

As an example of such sequencing, for a predetermined period of time the right side laser 476 may be activated while the right side camera 484 records the location of the vertical swath of light on the right side surface of the workpiece 44. At the end of the predetermined period of time, the right side laser 476 is deactivated while the right side camera 484 ceases to record. Next, the left side laser 514 is activated while the left side camera 522 records the location of the vertical swath of light on the left side surface of the workpiece 44, and so forth. The desired density of the scan determines the period of time for scanning/data acquisition, with a denser scan slowing the speed with which the scanning carriage 408 moves along the x-axis. The inventors have found that the relationship between the density of the scan (the density of the three dimensional point cloud representation of the surface of the workpiece 44) and the speed of the scan ($v_{max}$) (e.g., the movement of the scanning carriage 408 along the scan axis) may be determined by the equation $$v_{max} = \frac{S_d}{t},$$

where $S_d$ is the scan density and where $t = \sum_{n=1}^{k}(L_t + C_t)_n$ is the total necessary time to capture a single acquisition from all scanning units.

Preferably, in one embodiment of the illustrated system 40, the scanning assembly 400 can achieve a scan speed of scanning 1 meter along the x-axis in 19 seconds. Likewise, the scanning assembly 400 can preferably achieve a range of scan densities (point cloud density) from of about 0.0015 cm to about 8 cm.

With reference to FIG. 12, when the scanning carriage 408 has reached the end of the predetermined scan distance or "process window", the carriage 408 returns toward the scanning gantry 404 along the x-axis and away from the workpiece 44. The application evaluates the location data acquired by each scanning unit, recorded in tabular form in memory, and stitches the data into a single three-dimensional point cloud representation of the surfaces of the workpiece 44. The application creates a triangular mesh from the point cloud. In order to find the true normal of a given surface of the workpiece 44, the application analyzes the scan data at the center of each feature to be created in the workpiece 44 (e.g., bolt hole). The application moves outward from the center of the feature in two directions and performs a line fit in each direction. Taking the cross-product of the line fits results in a normal vector of the given surface. The application can average the normal vectors of multiple line fits in order to arrive at a normal vector to be utilized by the industrial robot 208 to control the yaw, pitch, and role of the processing tool. The difference between the real world calculated surface normal and the surface normal of the workpiece surface in the CAD/CAM file is programmed into the industrial robot 208 as an offset.

It will be appreciated that other algorithms for calculating the offset or the real world surface normal can be utilized. For example, the normal may be calculated by varying the number of neighboring data cloud points sampled, or the number of normal vectors utilized or averaged may be varied, etc. A variety of algorithms for mesh construction and data analysis are known in the art, and can be found in *Surface Reconstruction from Unorganized Point Cloud Data via Progressive Local Mesh Matching*, Ji Ma, University of Western Ontario, August 2011, the entirety of which is incorporated by reference herein.

The inventors have further determined that the three-dimensional point cloud representation of the surfaces of the workpiece 44 enables the application to determine and monitor the flange thickness (e.g., the right side flange 56 and/or the left side flange 60). If the application detects differences between the real world thicknesses and the ideal thicknesses of the workpiece in the CAD/CAM file, beyond a predetermined threshold, then the application may alert the user to the discrepancy. Such advance warning to the operator may reduce process cycle time.

The inventors have further determined that the three-dimensional point cloud representation of the surfaces of the workpiece 44 enables the application to determine the existence of defects in the workpiece 44 (e.g., twists in the workpiece, dents in the workpiece surface, or other deformations cause by material handling or production of the workpiece). If the application detects differences between the real world geometry of the workpiece 44 and the ideal geometry of the workpiece in the CAD/CAM file, beyond a predetermined threshold, then the application may alert the user to the discrepancy. Such advance warning to the operator of defects in the workpiece 44 may also reduce process cycle time. For example, the application may include a predetermined threshold of variation allowable for a given workpiece 44. Ideally the web 64 is normal to a flanges 56, 60 of the workpiece 44. If the web 64 intersects one of the flanges 56, 60 at an interior angle of 80 degrees, exceeding the threshold variation allowed, then the application may alert the user. The scanning assembly 400 herein may therefore alert the user of the system 40 to the existence of defects that may otherwise render a portion of the workpiece 44 unsuitable The application then generates and sends motion instructions for the industrial robot 208, which must be transformed into the three-dimensional coordinate space or reference frame of the industrial robot 208. Preferably, the motion instructions for the industrial robot 208 are provided by the application via file transfer protocol "FTP" over a network connection. When the motion instructions have been successfully transferred, the PLC initiates the processing by the industrial robot 208. The application displays the status of each process as it is completed by the industrial robot 208. To begin a process, the universal attachment 216 of the industrial robot 208 mates with one of the oxygen acetylene torch 192, the plasma cutting torch 196, and the plasma marking torch 200 as determined by the application. The application records the three dimensional coordinates of the particular processing tool being used by the industrial robot 208 and controls the gas ignition and mixing via the electronic and pneumatic valves of the intelligent gas mixture system 700. Historical location and pressure data are recorded during each process and may be stored in memory.

In an example of operation, the industrial robot 208 will receive motion instructions for cutting the first of a plurality of bolt holes in the right side flange 56 of the workpiece 44. The industrial robot 208 will attach or mate with the plasma cutting torch 196 and move to the center of the first hole to be cut. The location of the cutting torch 196 with respect to the surface of the right side flange 56 is determined by the aforementioned point cloud representation of the workpiece 44. The industrial robot 208 will proceed to cut the first bolt hole into the right side flange 56 and repeat the process for the remaining bolt holes. Once the job or task of cutting the bolt holes is completed, the industrial robot 208 will be given a new task, such as layout marking of the web 64 of the workpiece 44. The industrial robot 208 will receive motion instructions for marking the web 64 and will attach or mate with the plasma marking cutting torch 200 and move to the location of the first layout marking to be made. The location of the plasma marking cutting torch 200 with respect to the surface of the web 64 is determined by the aforementioned point cloud representation of the workpiece 44. The industrial robot 208 will proceed to mark the web 64.

The historical data of the gas mixture system 700 can be used to decrease process cycle time. For example, if the first feature to be cut into the workpiece 44 is a first bolt hole, a portion the surface of the workpiece 44 at the location of the first bolt hole must be preheated with the oxygen preheat line prior to initiating the material removal and fuel lines for cutting the bolt hole. If the next feature to be cut into the workpiece 44 is a second bolt hole in the vicinity of the first bolt hole, then the portion the surface of the workpiece 44 at the location of the second bolt hole need not be preheated as long as the location of the first bolt hole due to heat transfer via conduction through the workpiece 44. Accounting for such heat transfer, the application may reduce the preheating of the workpiece 44 at the second and subsequent feature locations in order to reduce on process cycle time.

Small scrap material that is removed from the workpiece 44 falls onto the rollers 364 of the scrap conveyor 340 and may be conveyed away system 40 at any time.

When all processes have been performed on the first, leading portion or length of the workpiece 44 in the processing volume, the inlet conveyor 48 moves the clamped workpiece forward along the processing path "P" toward and onto the outlet conveyor 300 so that the next portion or length of the workpiece 44 to be scanned is located within the processing volume (the second or next process window) for being subjected to scanning and processing steps, such as described above for the first portion of the workpiece 44.

When there are only processes remaining to be performed on the trailing end of the workpiece 44, the pushing assembly 164 can be used to assist the workpiece 44 in moving forward onto the outlet conveyor 300 until the trailing end is located within the processing volume. With the trailing end located within the processing volume, the exit datum assembly 598 engages the workpiece 44. Specifically, the left side clamp member 610 engages the left side flange 60 to driving the right side flange 56 against the right side clamp member 602. With the workpiece 44 thus clamped, the trailing end of the workpiece 44 can be scanned and processed as described above.

Following the processing of the trailing end of the workpiece 44, the workpiece 44 is then removed from the outlet conveyor 300 such as by being conveyed onto a mating conveyor, lifted by a forklift or crane, etc. (not illustrated).

It will be appreciated that in accordance with broad aspects of the present invention, a system in accordance with the teachings of the present invention may include the inventive aspects of the scanning assembly 400 but not the inventive aspects of the gas mixing system 700, or vice versa.

It will be readily apparent from the foregoing detailed description of the invention and from the illustrations thereof that numerous variations and modifications may be effected without departing from the true spirit and scope of the novel concepts or principles of this invention.

For example, in some applications the scanning assembly 400 may be provided for incorporation into, and/or for cooperating with, a different processing system for performing different types of processes than those discussed above (e.g., such other processes including drilling, punching, and other material handling processes, etc.). Furthermore, it will be appreciated that in such an application the scanning assembly 400 need not be provided with any gas mixing system 700.

In further example, in other applications the gas mixing system 700 may be provided for incorporation into, and/or for cooperating with, a different processing system for performing different types of processes that do not employ the above-described scanning assembly 400 and that may instead use a laser edge sensing system or a touch sensing system.

In yet other applications, the scanning assembly 400 and/or the gas mixing system 700 may be provided separately for use with separate or pre-existing processing equipment, machinery, or other systems.

What is claimed is:

1. A system for processing a workpiece, said system comprising:
   (A) a support surface for supporting a workpiece and defining a processing path;
   (B) a processing tool movable with respect to said processing path;
   (C) a sensor carriage movable along a scan axis, said sensor carriage having
      (1) at least one light source located to emit a light beam at an angle to said scan axis onto a target surface of a workpiece,
      (2) at least one camera configured to record location data of said light beam on a target surface of a workpiece as said sensor carriage moves along said scan axis; and
   (D) a control system for generating a three-dimensional point representation of a workpiece surface from said light beam location data, and said control system for controlling movement of said processing tool based on said three-dimensional point representation of a workpiece; and
   wherein said at least one light source of said sensor carriage has a wavelength configurable based on a surface condition of a workpiece.

2. A system for processing a workpiece, said system comprising:
   (A) a support surface for supporting a workpiece and defining a processing path;
   (B) a processing tool movable with respect to said processing path; and
   (C) a gas mixture system for controlling a gas used by said processing tool, said gas mixture system having a gas supply source, at least one pressure sensor, a processor and a memory configured to record historical pressure data of gases used by said processing tool, said gas mixture system configured to control the flow of a gas used by said processing tool based on historical three-dimensional coordinates of said processing tool.

* * * * *